US008634094B2

(12) United States Patent
Yamada et al.

(10) Patent No.: US 8,634,094 B2
(45) Date of Patent: Jan. 21, 2014

(54) IMAGE PROCESSING APPARATUS, IMAGE PROCESSING METHOD AND NON-TRANSITORY COMPUTER READABLE MEDIUM STORING PROGRAM

(75) Inventors: Toshiyuki Yamada, Kanagawa (JP); Kiyotaka Tsuchibuchi, Kanagawa (JP); Junichi Shimizu, Kanagawa (JP); Hiroshi Niina, Kanagawa (JP); Tetsuya Wakiyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 305 days.

(21) Appl. No.: 13/230,551

(22) Filed: Sep. 12, 2011

(65) Prior Publication Data

US 2012/0250078 A1 Oct. 4, 2012

(30) Foreign Application Priority Data

Mar. 28, 2011 (JP) ................................. 2011-069575

(51) Int. Cl.

*G06F 3/12* (2006.01)
*G06K 15/02* (2006.01)
*H04N 1/40* (2006.01)
*H04N 1/46* (2006.01)

(52) U.S. Cl.

USPC ........... 358/1.15; 358/1.2; 358/1.9; 358/3.12; 358/530

(58) Field of Classification Search

None
See application file for complete search history.

(56) References Cited

U.S. PATENT DOCUMENTS

| | | | |
|---|---|---|---|
| 6,163,623 A | 12/2000 | Ohta | |
| 2007/0139711 A1* | 6/2007 | Miyata | 358/1.18 |
| 2007/0177183 A1 | 8/2007 | Robinson et al. | |
| 2011/0149346 A1* | 6/2011 | Suzuki | 358/1.15 |

FOREIGN PATENT DOCUMENTS

| | | |
|---|---|---|
| JP | 04-023185 A | 1/1992 |
| JP | 05-342408 A | 12/1993 |
| JP | 08-44827 A | 2/1996 |
| JP | 09-128480 A | 5/1997 |
| JP | 2002-073598 A | 3/2002 |
| JP | 2005-128925 A | 5/2005 |

OTHER PUBLICATIONS

Australian Office Action issued Feb. 11, 2013, in corresponding Australian Patent Application No. 2011253923.

* cited by examiner

*Primary Examiner* — Thomas Lett
(74) *Attorney, Agent, or Firm* — Sughrue Mion, PLLC

(57) ABSTRACT

An image processing apparatus includes: a structure information acquisition portion that acquires, from a list which is included in each of plural pieces of image data sorted in a predetermined order and is formed of rows and columns, structure information which includes row information including at least the number of the rows of the list and heights of the rows thereof and column information including at least the number of the columns thereof and the widths of the columns thereof; a list connection determination portion that determines, based on the acquired structure information, a set of connected lists among the lists respectively included in the plural pieces of the image data, and a connection direction of the connected lists; and a list connection portion that connects the set of the determined lists in the determined connection direction in an order of the plural pieces of the image data listed.

20 Claims, 19 Drawing Sheets

PRINT
REGENERATION
PAPER DOCUMENT
LIST SECTION IN ORIGINAL ELECTRONIC DOCUMENT
LIST SECTIONS IN REGENERATED ELECTRONIC DOCUMENT

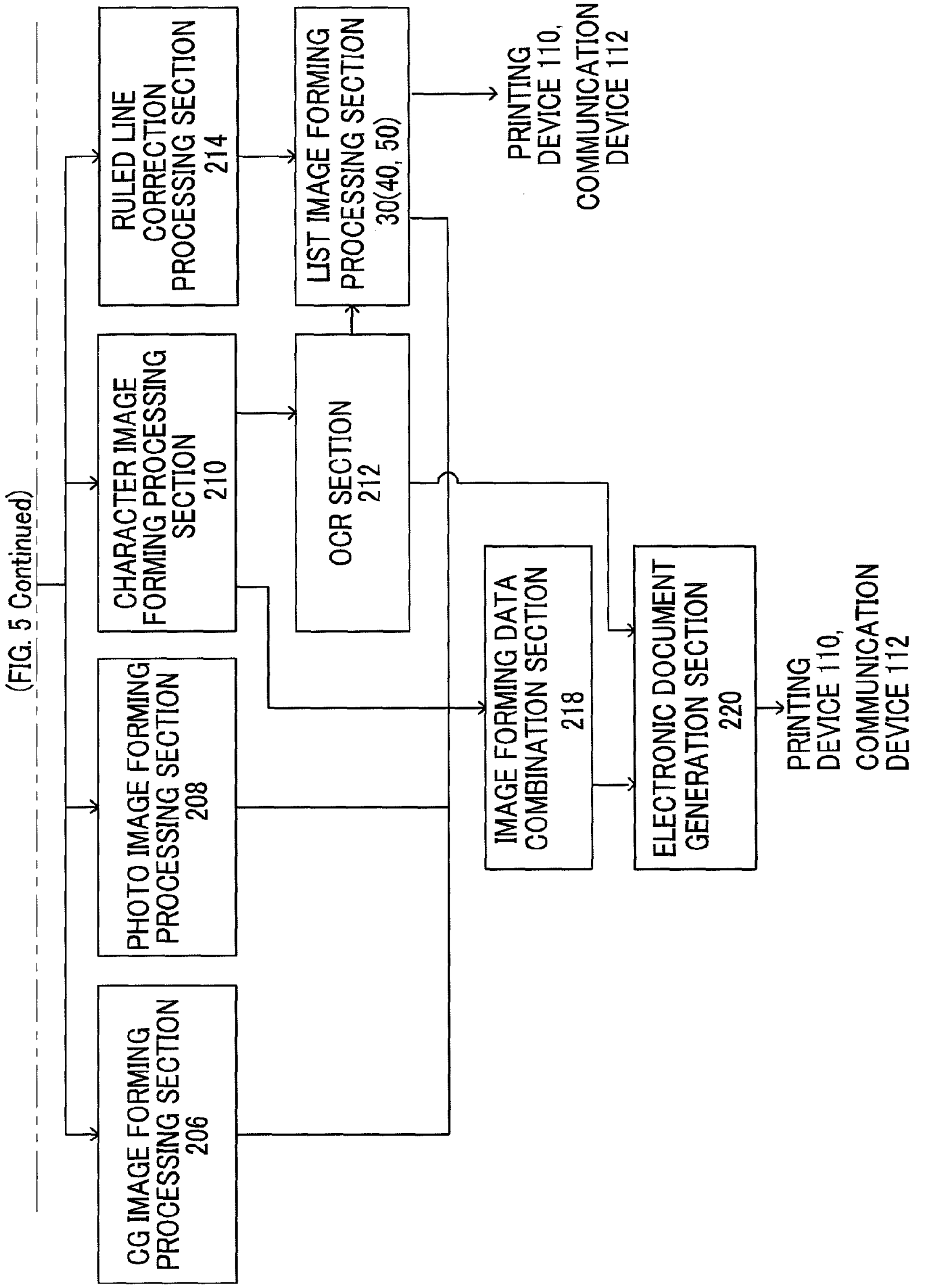
(FIG. 5 Continued)
RULED LINE CORRECTION PROCESSING SECTION 214
LIST IMAGE FORMING PROCESSING SECTION 30(40, 50)
PRINTING DEVICE 110, COMMUNICATION DEVICE 112
CHARACTER IMAGE FORMING PROCESSING SECTION 210
OCR SECTION 212
PHOTO IMAGE FORMING PROCESSING SECTION 208
IMAGE FORMING DATA COMBINATION SECTION 218
ELECTRONIC DOCUMENT GENERATION SECTION 220
PRINTING DEVICE 110, COMMUNICATION DEVICE 112
CG IMAGE FORMING PROCESSING SECTION 206

FIG. 7

| LIST ID | STORED POSITION INFORMATION | NUMBER OF COLUMNS | WIDTHS OF COLUMNS | SHADING PATTERN | . . . | VERTICAL CONNECTION ID | HORIZONTAL CONNECTION ID |
|---|---|---|---|---|---|---|---|
| 1 | p1 | 4 | 8.5, 7.5, 6, 10 | 2, 0, 0, 0<br>2, 0, 0, 0<br>2, 0, 0, 0<br>2, 0, 0, 0 | . . . | 1 | 1 |
| 2 | p2 | 4 | 8.5, 7.5, 6, 10 | 2, 0, 0, 0<br>. . . | . . . | 1 | 2 |
| 3 | p3 | 4 | 8.5, 7.5, 6, 10 | 2, 0, 0, 0<br>. . . | . . . | 1 | 3 |
| 4 | p4 | 5 | 8.5, 7.5, 6, 5, 10 | 0, 0, 2, 0, 0<br>. . . | . . . | 2 | 4 |
| 5 | p5 | 5 | 8.5, 7.5, 6, 5, 10 | 0, 0, 2, 0, 0<br>. . . | . . . | 2 | 5 |
| . . . | . . . | . . . | . . . | . . . | . . . | . . . | . . . |

FIG. 10A

| NO. | AAA | BBB | CCC | DDD |
|---|---|---|---|---|
| 1 | ○○○ | ××× | □□□ | △△△ |
| 2 | ■■■ | ▲▲▲ | ◎◎◎ | ◇◇◇ |
| 3 | □□□ | △△△ | ■■■ | ▲▲▲ |
| 4 | △△△ | ○○○ | □□□ | ■■■ |
| 5 | ○○○ | ××× | □□□ | △△△ |
| 6 | ■■■ | ▲▲▲ | ◎◎◎ | ◇◇◇ |
| 7 | △△△ | ○○○ | □□□ | ■■■ |
| 8 | ○○○ | ××× | □□□ | △△△ |
| 9 | ■■■ | ▲▲▲ | ◎◎◎ | ◇◇◇ |
| 10 | ■■■ | ▲▲▲ | ◎◎◎ | ◇◇◇ |
| 11 | △△△ | ○○○ | □□□ | ■■■ |
| 12 | □□□ | △△△ | ○○○ | ××× |

TITLED LIST SECTIONS IN ORIGINAL ELECTRONIC DOCUMENT

PRINT

FIG. 10B

| NO. | AAA | BBB | CCC | DDD |
|---|---|---|---|---|
| 1 | ○○○ | ××× | □□□ | △△△ |
| 2 | ■■■ | ▲▲▲ | ◎◎◎ | ◇◇◇ |
| 3 | □□□ | △△△ | ■■■ | ▲▲▲ |
| 4 | △△△ | ○○○ | □□□ | ■■■ |

1

| NO. | AAA | BBB | CCC | DDD |
|---|---|---|---|---|
| 5 | ○○○ | ××× | □□□ | △△△ |
| 6 | ■■■ | ▲▲▲ | ◎◎◎ | ◇◇◇ |
| 7 | △△△ | ○○○ | □□□ | ■■■ |
| 8 | ○○○ | ××× | □□□ | △△△ |

2

| NO. | AAA | BBB | CCC | DDD |
|---|---|---|---|---|
| 9 | ■■■ | ▲▲▲ | ◎◎◎ | ◇◇◇ |
| 10 | ■■■ | ▲▲▲ | ◎◎◎ | ◇◇◇ |
| 11 | △△△ | ○○○ | □□□ | ■■■ |
| 12 | □□□ | △△△ | ○○○ | ××× |

3

PAPER DOCUMENT

REGENERATION

FIG. 10C

| NO. | AAA | BBB | CCC | DDD |
|---|---|---|---|---|
| 1 | ○○○ | ××× | □□□ | △△△ |
| 2 | ■■■ | ▲▲▲ | ◎◎◎ | ◇◇◇ |
| 3 | □□□ | △△△ | ■■■ | ▲▲▲ |
| 4 | △△△ | ○○○ | □□□ | ■■■ |

| NO. | AAA | BBB | CCC | DDD |
|---|---|---|---|---|
| 5 | ○○○ | ××× | □□□ | △△△ |
| 6 | ■■■ | ▲▲▲ | ◎◎◎ | ◇◇◇ |
| 7 | △△△ | ○○○ | □□□ | ■■■ |
| 8 | ○○○ | ××× | □□□ | △△△ |

| NO. | AAA | BBB | CCC | DDD |
|---|---|---|---|---|
| 9 | ■■■ | ▲▲▲ | ◎◎◎ | ◇◇◇ |
| 10 | ■■■ | ▲▲▲ | ◎◎◎ | ◇◇◇ |
| 11 | △△△ | ○○○ | □□□ | ■■■ |
| 12 | □□□ | △△△ | ○○○ | ××× |

TITLED LIST SECTIONS IN REGENERATED ELECTRONIC DOCUMENT

| | | | | |
|---|---|---|---|---|
| 5 | ○○○ | ××× | □□□ | △△△ |
| 6 | ■■■ | ▲▲▲ | ◎◎◎ | ◇◇◇ |
| 7 | △△△ | ○○○ | □□□ | ■■■ |
| 8 | ○○○ | ××× | □□□ | △△△ |

| | | | | |
|---|---|---|---|---|
| 9 | ■■■ | ▲▲▲ | ◎◎◎ | ◇◇◇ |
| 10 | ■■■ | ▲▲▲ | ◎◎◎ | ◇◇◇ |
| 11 | △△△ | ○○○ | □□□ | ■■■ |
| 12 | □□□ | △△△ | ○○○ | ××× |

| | | | | |
|---|---|---|---|---|
| 5 | ○○○ | ××× | □□□ | △△△ |
| 6 | ■■■ | ▲▲▲ | ◎◎◎ | ◇◇◇ |
| 7 | △△△ | ○○○ | □□□ | ■■■ |
| 8 | ○○○ | ××× | □□□ | △△△ |

FIG. 11C

| NO. | AAA | BBB | CCC | DDD |
|---|---|---|---|---|
| 1 | ○○○ | ××× | □□□ | △△△ |
| 2 | ■■■ | ▲▲▲ | ◎◎◎ | ◇◇◇ |
| 3 | □□□ | △△△ | ■■■ | ▲▲▲ |
| 4 | △△△ | ○○○ | □□□ | ■■■ |
| 5 | ○○○ | ××× | □□□ | △△△ |
| 6 | ■■■ | ▲▲▲ | ◎◎◎ | ◇◇◇ |
| 7 | △△△ | ○○○ | □□□ | ■■■ |
| 8 | ○○○ | ××× | □□□ | △△△ |
| 9 | ■■■ | ▲▲▲ | ◎◎◎ | ◇◇◇ |
| 10 | ■■■ | ▲▲▲ | ◎◎◎ | ◇◇◇ |
| 11 | △△△ | ○○○ | □□□ | ■■■ |
| 12 | □□□ | △△△ | ○○○ | ××× |

| Item | AB | CD | EF | GH |
|---|---|---|---|---|
| 1 | ○○○ | ××× | □□□ | △△△ |
| 2 | ■■■ | ▲▲▲ | ◎◎◎ | ◇◇◇ |
| 3 | □□□ | △△△ | ■■■ | ▲▲▲ |
| 4 | △△△ | ○○○ | □□□ | ■■■ |
| 5 | ○○○ | ××× | □□□ | △△△ |
| 6 | ■■■ | ▲▲▲ | ◎◎◎ | ◇◇◇ |
| 7 | △△△ | ○○○ | □□□ | ■■■ |
| 8 | ○○○ | ××× | □□□ | △△△ |

TITLED LIST SECTIONS IN REGENERATED ELECTRONIC DOCUMENT

FIG. 13

| LIST ID | STORED POSITION INFORMATION | TITLE ROW INFORMATION | CONNECTION ID |
|---|---|---|---|
| 1 | p1 | No., AAA, BBB, CCC, DDD | 1 |
| 2 | p2 | No., AAA, BBB, CCC, DDD | 1 |
| 3 | p3 | No., AAA, BBB, CCC, DDD | 1 |
| 4 | p4 | Item, AB, CD, EF, GH | 2 |
| 5 | p5 | Item, AB, CD, EF, GH | 2 |
| ... | ... | ... | ... |

S42

IMAGE PROCESSING APPARATUS, IMAGE PROCESSING METHOD AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2011-069575 filed Mar. 28, 2011.

BACKGROUND

Technical Field

The present invention relates to an image processing apparatus, an image processing method, and a non-transitory computer readable medium storing a program.

SUMMARY

According to an aspect of the invention, there is provided an image processing apparatus including: a structure information acquisition portion that acquires, from a list which is included in each of plural pieces of image data sorted in a predetermined order and is formed of rows and columns, structure information which includes row information including at least the number of the rows of the list and heights of the respective rows thereof and column information including at least the number of the columns thereof and the widths of the respective columns thereof; a list connection determination portion that determines, on the basis of the acquired structure information, a set of connected lists among the lists respectively included in the plural pieces of the image data, and a connection direction of the connected lists; and a list connection portion that connects the set of the determined lists in the determined connection direction in an order of the plural pieces of the image data listed.

BRIEF DESCRIPTION OF THE DRAWINGS

Exemplary embodiments of the present invention will be described in detail based on the following figures, wherein:

FIG. 1A is a diagram illustrating an electronic document which includes characters, a list, CG (Computer Graphics), a photo, and the like;

FIG. 1B is a diagram illustrating a paper document which is output by printing the electronic document shown in FIG. 1A;

FIG. 7 is a diagram illustrating a first list information table which is stored in the first list information memory shown in FIG. 6;

FIG. 10A is a diagram illustrating a titled list section in the electronic document;

FIG. 10B is a diagram illustrating plural paper documents which are output by titling and printing the list section shown in FIG. 10A;

FIG. 10C is a diagram illustrating an electronic document which is regenerated from the plural paper documents shown in FIG. 10B by the existing image processing apparatus;

FIG. 11C is a diagram illustrating an electronic document which is regenerated by an image processing apparatus according to a second exemplary embodiment of the invention;

FIG. 13 is a diagram illustrating a second list information table which is stored in the second list information memory shown in FIG. 12;

DETAILED DESCRIPTION

Background on How Exemplary Embodiment is Made

Hereinafter, before the description of the exemplary embodiment, in order to facilitate understanding, a description will be given of how the exemplary embodiment is made.

Figures 1A, 1B:
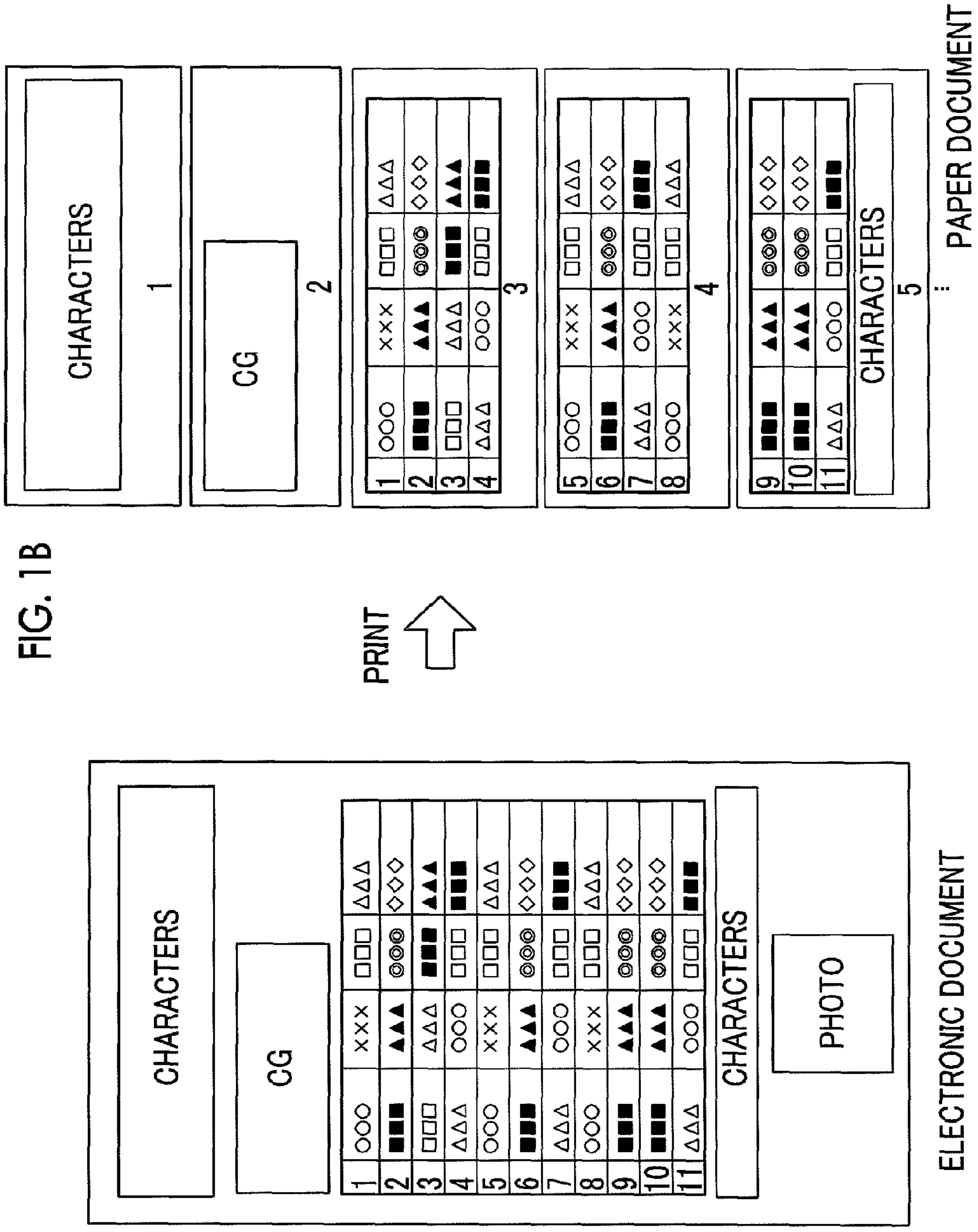

FIG. 1A is a diagram illustrating an electronic document which includes characters, a list (which is constituted of, for example, rows and columns), CG (Computer Graphics), a photo, and the like. FIG. 1B is a diagram illustrating a paper document which is output by printing the electronic document shown in FIG. 1A.

For example, when one sheet of paper is not enough to print the electronic document shown in FIG. 1A thereon, as shown in FIG. 1B, a printing device divides the electronic document in accordance with the size of the print sheet, and prints and outputs the divided electronic documents on plural paper documents.

An image processing apparatus regenerates the electronic document from image data of the paper documents which are read out by an image reading device connected to the image processing apparatus.

Figures 2A, 2B, 2C:
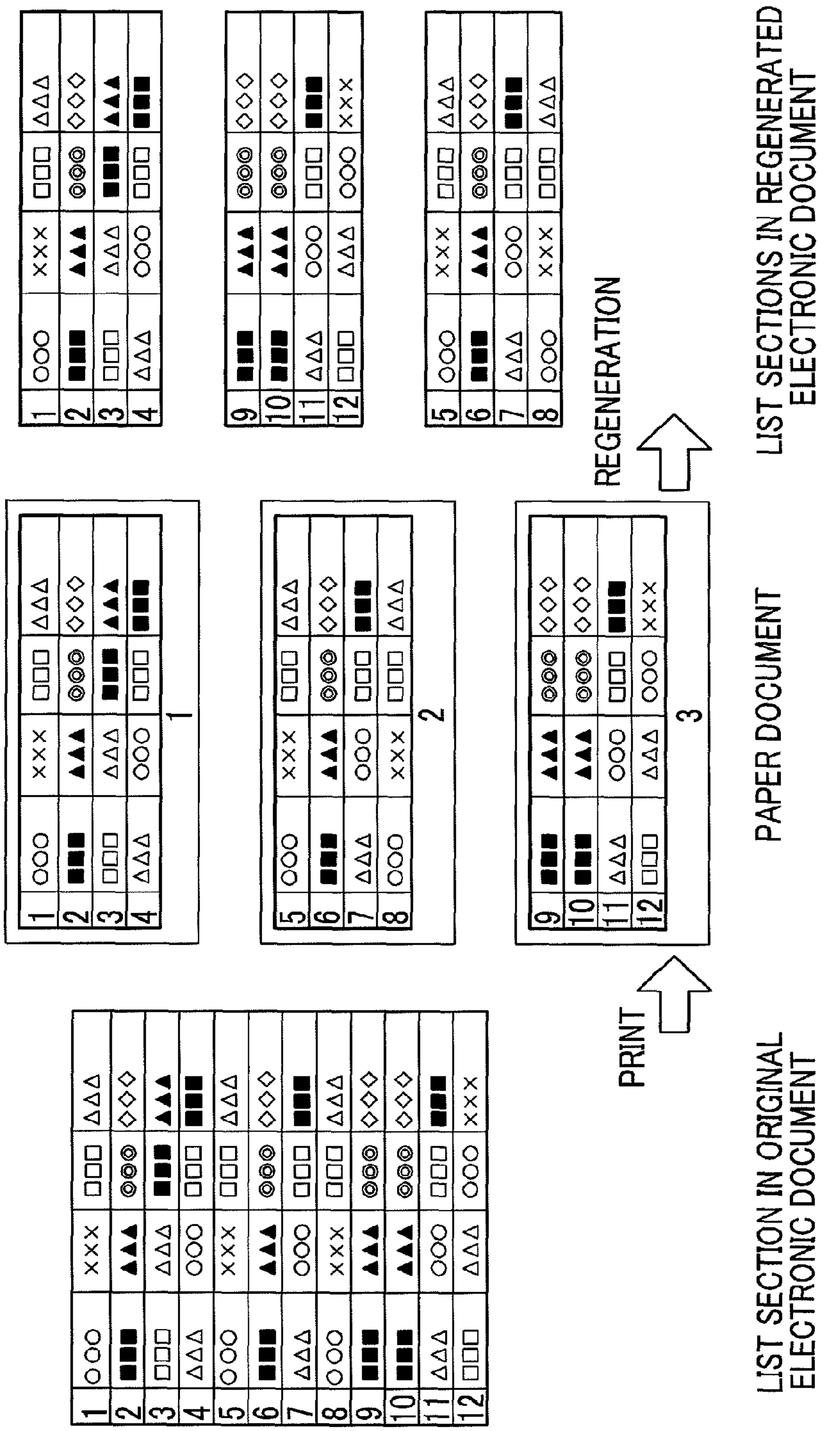
FIG. 2A is a diagram illustrating a list section in the electronic document shown in FIG. 1A.
FIG. 2B is a diagram illustrating plural paper documents which are output by printing the list section shown in FIG. 2A.
FIG. 2C is a diagram illustrating an electronic document which is regenerated from the plural paper documents shown in FIG. 2B by the existing image processing apparatus.

FIG. 2A is a diagram illustrating a list section in the electronic document shown in FIG. 1A. FIG. 2B is a diagram illustrating plural paper documents which are output by printing the list section shown in FIG. 2A. FIG. 2C is a diagram illustrating an electronic document which is regenerated from the plural paper documents shown in FIG. 2B by the existing image processing apparatus.

In the case of using the above-mentioned printing device and image processing apparatus, the list section in the electronic document shown in FIG. 2A is divided, and is printed on plural paper documents as shown in FIG. 2B. Then, the image processing apparatus regenerates an electronic document such that the lists printed on the plural paper documents are respectively expressed as individual independent lists as shown in FIG. 2C.

For this reason, the regenerated electronic document (FIG. 2C) differs from the original electronic document (FIG. 2A). Therefore, a user should reconstruct the regenerated electronic document in a certain method such that the regenerated electronic document is the same as the original electronic document.

Figures 3A, 3B, 3C:
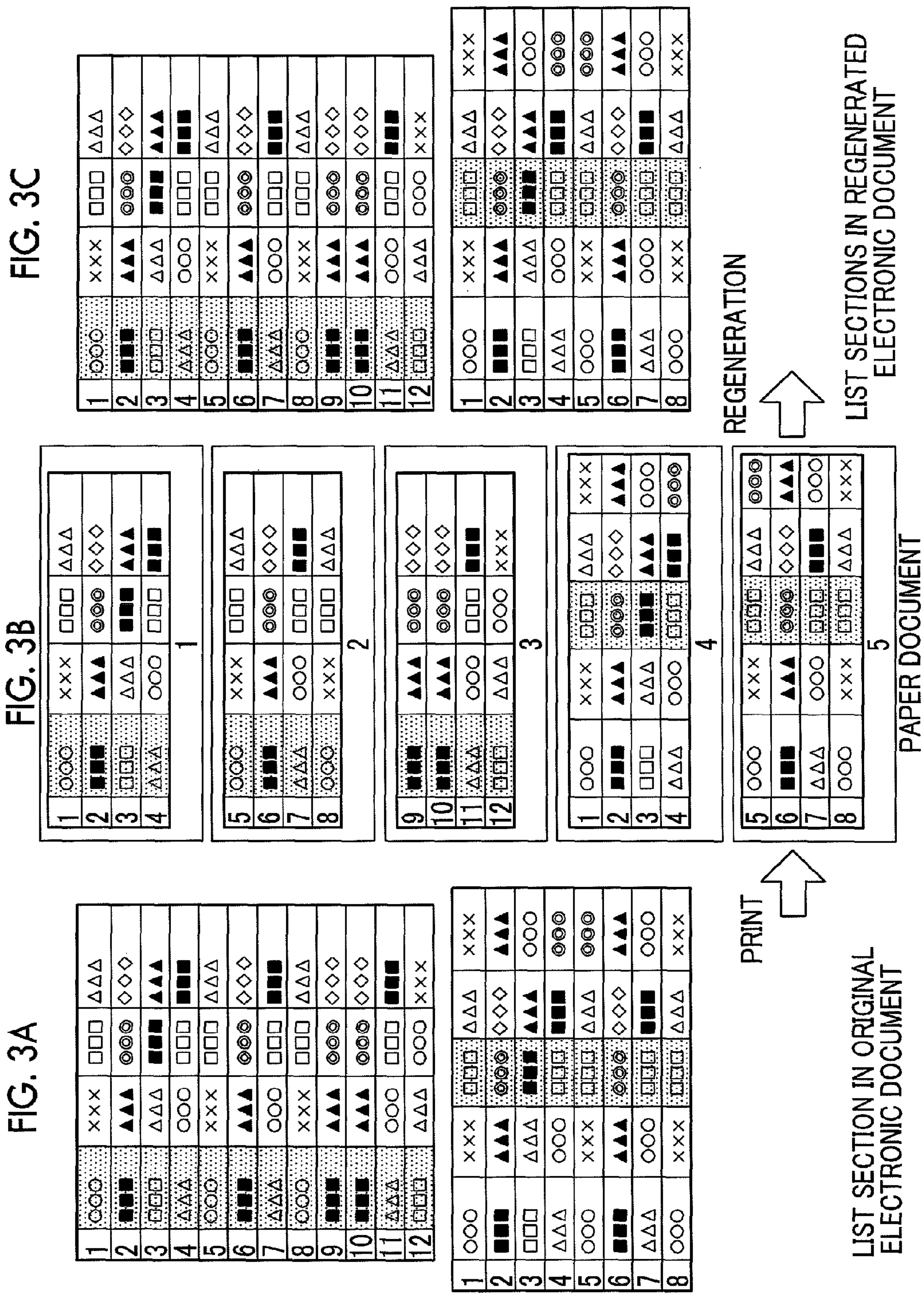
FIG. 3A is a diagram illustrating list sections in an electronic document.
FIG. 3B is a diagram illustrating plural paper documents which are output by printing the list section shown in FIG. 3A.
FIG. 3C is a diagram illustrating an electronic document which is regenerated from the plural paper documents shown in FIG. 3B by an image processing apparatus according to a first exemplary embodiment of the invention.

FIG. 3A is a diagram illustrating list sections in an electronic document. FIG. 3B is a diagram illustrating plural paper documents which are output by printing the list section shown in FIG. 3A. FIG. 3C is a diagram illustrating an electronic document which is regenerated from the plural paper documents shown in FIG. 3B by an image processing apparatus 1, which will be described below, according to an exemplary embodiment of the invention.

The image processing apparatus 1, which will be described below, according to an exemplary embodiment of the invention is made in consideration of the above-mentioned background. Accordingly, when the list sections (FIG. 3A) in the electronic document are divided, and are printed on plural paper documents (FIG. 3B), the image processing apparatus 1 regenerates an electronic document from the plural paper documents such that lists of the electronic document have the same structures as the lists of the original electronic document (FIG. 3C).

First Exemplary Embodiment

Hereinafter, a first exemplary embodiment of the invention will be described.

Image Processing Apparatus 1

Figure 4:
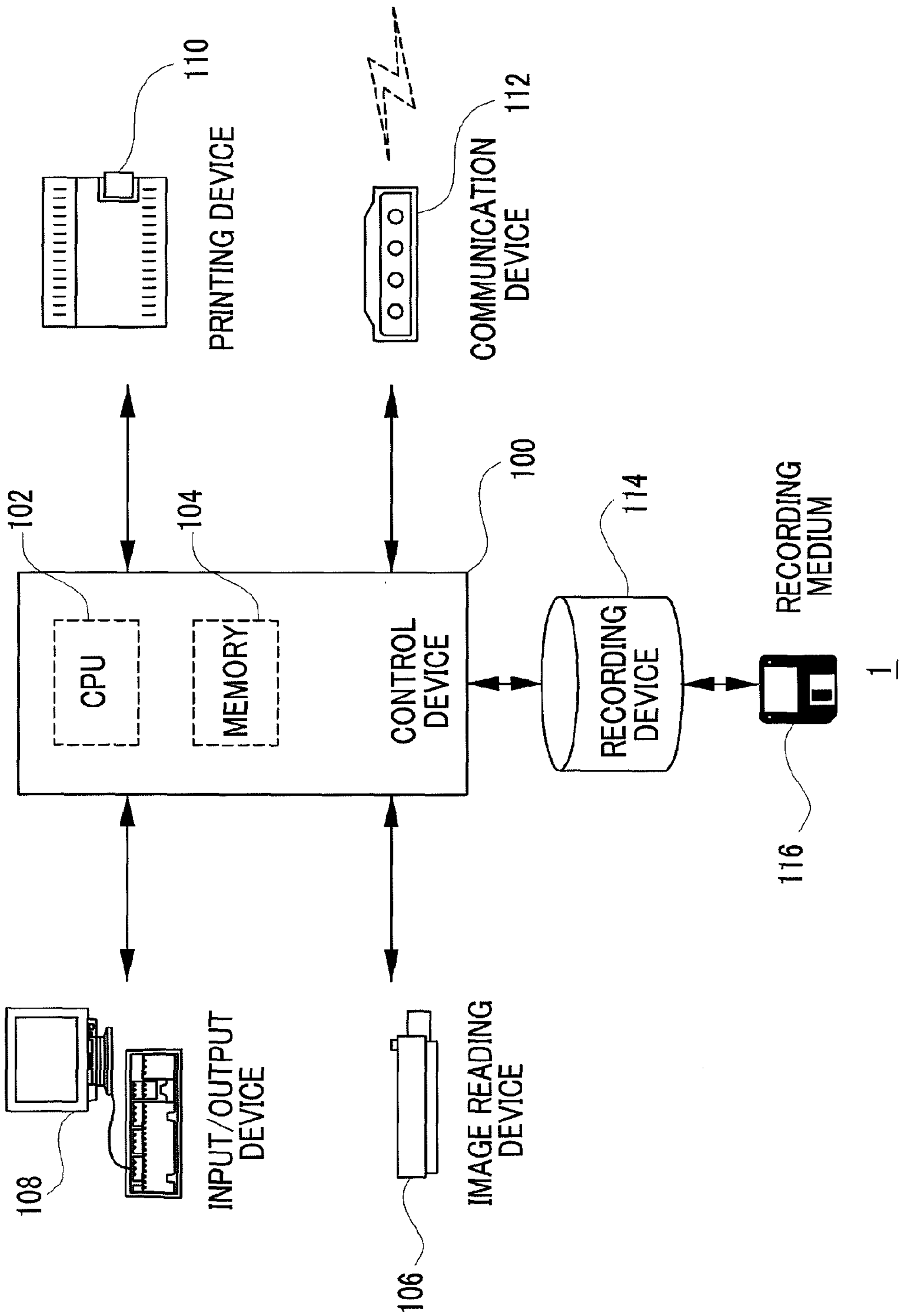
FIG. 4 is a diagram illustrating a hardware configuration of the image processing apparatus according to the exemplary embodiment.

FIG. 4 is a diagram illustrating a hardware configuration of the image processing apparatus 1.

As shown in FIG. 4, the image processing apparatus 1 includes: a control device 100 that includes a CPU 102 and a memory 104; an image reading device 106 that generates image data by reading out a paper document; an input/output device 108 that includes a key board, a touch panel, a display device, and the like; a printing device 110 that prints and outputs an electronic document; a communication device 112 that performs data communication with other devices; a recording device 114 that records and reproduces data on and from a recording medium 116 such as a CD device and an HDD device; and the like.

Hereinafter, in the respective drawings, substantially the same components and processing are represented by the same reference numerals and signs.

The image processing apparatus 1 receives the image data of the paper documents, on which the electronic document is printed, through the image reading device 106, the recording medium 116, and the like, regenerates an electronic document by processing the received image data (a description will be given later with reference to FIGS. 5 and 6), and outputs the document to the printing device 110 and the communication device 112.

Electronic Document Generation Program 20

Figure 5:
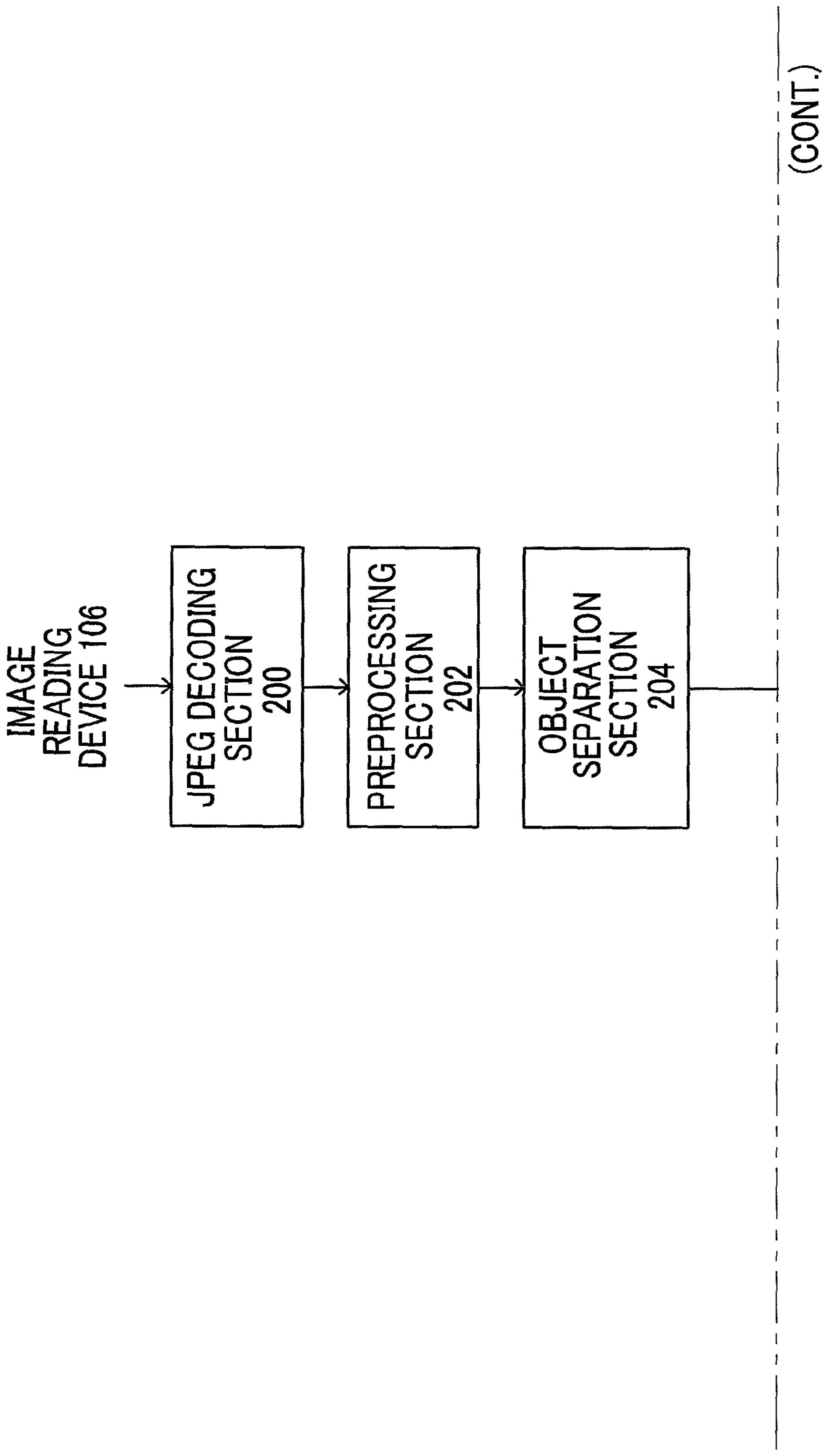
FIG. 5 is a diagram illustrating a configuration of a first electronic document generation program which is executed in the image processing apparatus shown in FIG. 4.

FIG. 5 is a diagram illustrating a configuration of a first electronic document generation program 20 which is executed in the image processing apparatus 1 (FIG. 4).

As shown in FIG. 5, the electronic document generation program 20 includes: a JPEG (Joint Photographic Experts Group) decoding section 200; a preprocessing section 202; an object separation section 204; a CG image forming processing section 206; a photo image forming processing section 208; a character image forming processing section 210; an OCR (Optical Character Recognition) section 212; a ruled line correction processing section 214; a first list image forming processing section 30; an image forming data combination section 218; and an electronic document generation section 220.

The electronic document generation program 20 is loaded into the memory 104 of the image processing apparatus 1 through, for example, the recording medium 116 (FIG. 4), and is executed by concretely using a hardware resource of the image processing apparatus 1 under OS (not shown in the drawings) which is operated in the image processing apparatus 1.

The electronic document generation program 20 regenerates an electronic document, which has attributes (characters, a list, CG, a photo, and the like) of the respective components constituting the image data, from the image data of the paper documents, on which the electronic document is printed, received through the image reading device 106, the recording medium 116 (FIG. 4), and the like.

The JPEG decoding section 200 decodes the image data, which is received and compressed through the image reading device 106, the recording medium 116 (FIG. 4), and the like, into decompressed image data, and outputs the image data to the preprocessing section 202.

The preprocessing section 202 performs preprocessing on the image data, which is input from the JPEG decoding section 200, before the object separation section 204 performs processing thereof, and outputs the image data to the object separation section 204.

Specifically, the preprocessing section 202 performs: processing of removing noise from the input image data; filtering processing of assisting in separating the image data into components (objects) such as characters, a list, CG, a photo; and the like.

In addition, the respective components of the image data are hereinafter referred to as a "character object", a "list object", a "CG object", a "photo object", and the like.

The object separation section 204 separates the respective objects from the image data which is input from the preprocessing section 202, and outputs the separated CG object to the CG image forming processing section 206, the photo object to the photo image forming processing section 208, the character object to the character image forming processing section 210, and the list object to the ruled line correction processing section 214.

The CG image forming processing section 206 generates CG image forming data (for example, vector image forming data), which is for generating the electronic document, from the CG object which is input from the object separation section 204, and outputs the data to the image forming data integration section 218.

The photo image forming processing section 208 generates photo image forming data (for example, image data), which is for generating the electronic document, from the photo object which is input from the object separation section 204, and outputs the data to the image forming data integration section 218.

The character image forming processing section 210 generates character image forming data (for example, text data and font data), which is for generating the electronic document, from the character object which is input from the object separation section 204, and outputs the data to the image forming data integration section 218 and the OCR section 212.

The OCR section 212 specifies characters and a position of the characters in the image data through the OCR processing for the image forming data which is input from the character image forming processing section 210.

Further, the OCR section 212 outputs the specified characters and position as character data to the first list image forming processing section 30 and the electronic document generation section 220.

The ruled line correction processing section 214 performs correction processing on fading and the slope of the ruled line of the list object which is input from the object separation section 204, and outputs them to the first list image forming processing section 30.

The first list image forming processing section 30 generates list image forming data (for example, data with a list format) generating the electronic document on the basis of the list object in which the character data input from the OCR section 212 and the ruled line input from the ruled line correction processing section 214 are corrected (a description thereof will be given in detail with reference to FIG. 6 and the like).

Further, the first list image forming processing section 30 outputs the image forming data of the generated list to the image forming data integration section 218, the printing device 110, and the communication device 112 (FIG. 4), or any one thereof.

The image forming data combination section 218 combines the image forming data which is input from the CG image forming processing section 206, the photo image forming processing section 208, the character image forming processing section 210, and the first list image forming processing section 30, and outputs the data to the electronic document generation section 220.

The electronic document generation section 220 generates an electronic document, in which the character data input from the OCR section 212 is embedded, at the same position as the image data which is read by the image reading device 106 (FIG. 4), in the combined data of the image forming data which is input from the image forming data combination section 218, and outputs the data to the printing device 110, the communication device 112 (FIG. 4), and the like.

First List Image Forming Processing Program 30

Figure 6:
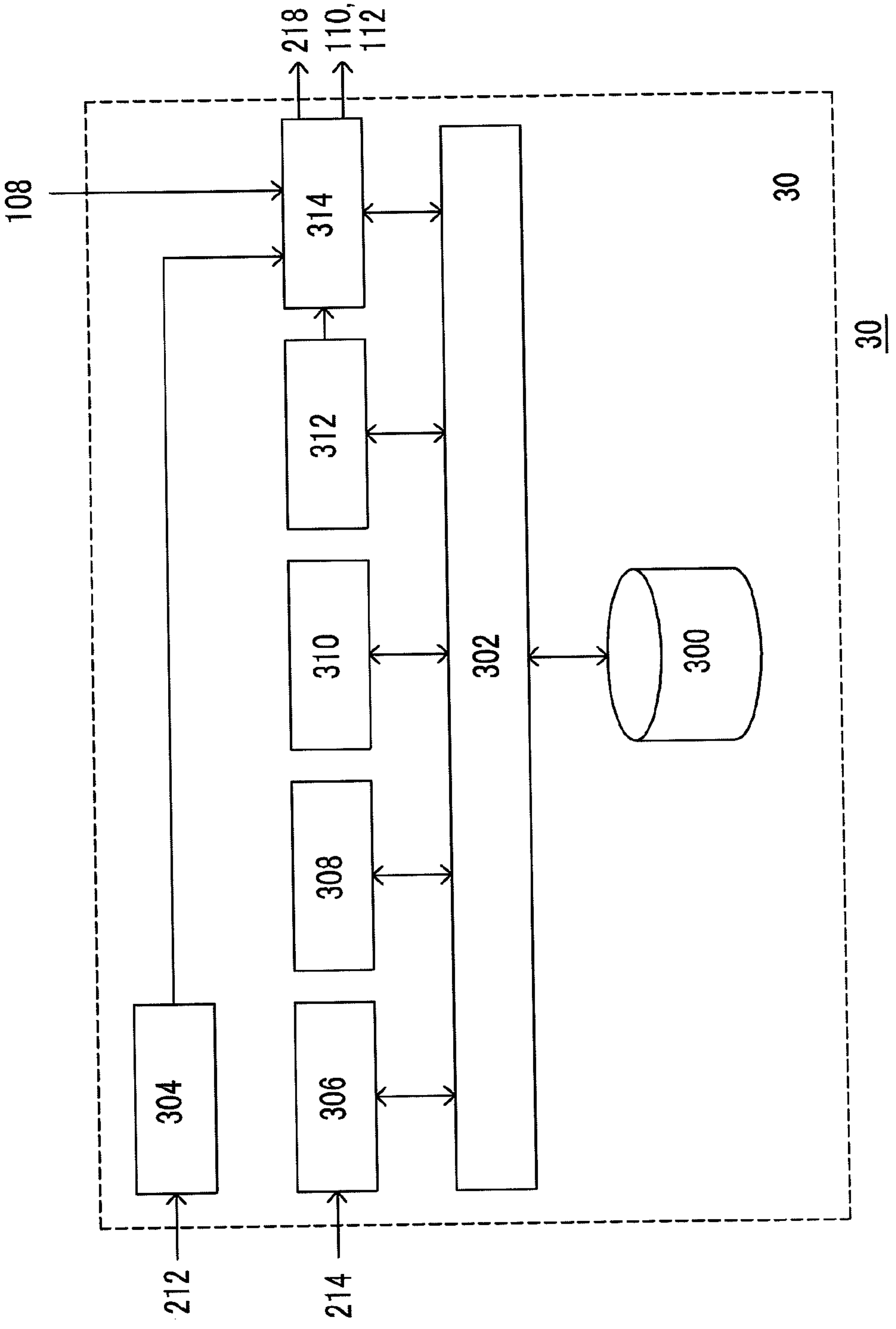
FIG. 6 is a diagram illustrating a configuration of a first list image forming processing program of the first electronic document generation program shown in FIG. 5.

FIG. 6 is a diagram illustrating a configuration of a first list image forming processing program 30 of the first electronic document generation program 20 shown in FIG. 5.

As shown in FIG. 6, the list image forming processing program 30 includes: a first list information memory 300; a first controller 302; a first character data memory 304; a first list scanning portion 306; a list structure acquisition portion 308; a first list connection determination portion 310; a first list connection portion 312; and a list image forming portion 314.

The list image forming processing program 30 generates list image forming data from the image data of the plural paper documents, in which the list section in the electronic document is divided and printed, so as to create the list with the same structure as that of the original electronic document.

FIG. 7 is a diagram illustrating a first list information table which is stored in the list information memory 300.

The list information memory 300 stores the first list information table, which is updated and referenced by the respective components shown in FIG. 6, through the controller 302.

The first list information table represents the list of the list information of the respective list objects which are divided in the electronic document.

As shown in FIG. 7, the list information includes, for example: list IDs for uniquely identifying the list objects; storage positions of the list objects (for example, addresses of the data storage areas in the memory); list structure information representing the list object structures; vertical connection IDs for identifying sets of the list objects connected in the vertical direction; and horizontal connection IDs for identifying sets of the list objects connected in the horizontal direction.

The list structure information includes, for example, the number of columns and the number of rows of the list object, widths of the respective columns (column widths) and heights of the respective rows (row heights), shading patterns of the respective cells, colors of the respective cells, and ruled line information (color, type, thickness, and the like) of each cell.

For example, as shown in FIG. 7, the list object of which the list ID is "1" is stored at the address "p1", the number of columns of the list is 4, the column widths thereof are 8.5, 7.5, 6, and 10 (cm) in order from the left column, the shading patterns of the respective cells are pattern 2, 0, 0, and 0 in order from the left side for every row, the vertical connection ID thereof is "1", and the horizontal connection ID thereof is "1".

The controller 302 (FIG. 6) controls the respective components.

The character data memory 304 receives the character data which is input from the OCR section 212 (FIG. 5), and stores the data such that the list image forming portion 314 is able to refer to the data.

The list scanning portion 306 scans the list objects, which are input from the ruled line correction processing section 214 (FIG. 5), so as to acquire the storage positions of the list objects and respectively assign the list IDs to the list objects (in addition, hereinafter, as a specific example, the following case is given: the list scanning portion 306 assigns the list IDs with new values to the list objects included in the respective pieces of the image data in the order in which the pieces of the image data including the list objects are read out).

Further, the list scanning portion 306 adds the assigned list IDs and the acquired storage positions to the first list information table, which is stored in the list information memory 300, through the controller 302.

The list structure acquisition portion 308 accesses the storage positions (FIG. 7) of the list objects with reference to the first list information table, which is stored in the list information memory 300, through the control of the controller 302, thereby acquiring the list structure information of each list object.

Further, the list structure acquisition portion 308 adds the acquired list structure information to the first list information table, which is stored in the list information memory 300, through the controller 302.

The list connection determination portion 310 determines sets of connected lists through the control of the controller 302, on the basis of the list structure information (FIG. 7) corresponding to each list ID, with reference to the ascending order of the list IDs of the first list information table which is stored in the list information memory 300 (a description thereof will be given later with reference to FIGS. 8 and 9).

Further, on the basis of the determination result, the list connection determination portion 310 adds the vertical connection IDs and the horizontal connection IDs of the respective lists to the first list information table, which is stored in the list information memory 300, through the controller 302 (a description thereof will be given later with reference to FIGS. 8 and 9).

The list connection portion 312 connects the respective list objects in the vertical direction or the horizontal direction with reference to the first list information table, which is stored in the list information memory 300, through the control of the controller 302.

Specifically, for example, first, the list connection portion 312 acquires the list objects, of which the vertical connection IDs have the same values in the first list information table, by accessing the storage positions (FIG. 7) thereof, and connects the list objects in the vertical direction (to the tail ends of the just previous list objects) in the ascending order of the list IDs.

Next, for example, the list connection portion 312 acquires the list objects, of which the horizontal connection IDs have the same values, among the list objects, which are not connected in the vertical direction, by accessing the storage positions thereof, and connects the list objects in the horizontal direction (to the right ends of the just previous list objects) in the ascending order of the list IDs.

Further, the list connection portion 312 outputs the connected list objects to the list image forming portion 314.

In addition, in the exemplary embodiment, priority is given to the connection in the vertical direction, but the invention is not limited to this, priority may be given to the connection in the horizontal direction.

Further, it may be appropriately changed whether priority is given to the vertical or horizontal connection direction, on the basis of user's designation, prescribed setting, and the like.

Further, the list connection determination portion 310 may determine only the list connection in any one of the vertical direction and horizontal direction.

The list image forming portion 314 embeds character data in the list objects, which are input from the list connection portion 312, with reference to the character data which is stored in the character data memory 304, thereby generating list image forming data.

Further, the list image forming portion 314 outputs the generated list image forming data to the image forming data combination section 218 (FIG. 5), the printing device 110, and the communication device 112 (FIG. 4), or any one or more thereof.

For example, when the list image forming data is output to the printing device 110 and the communication device 112, the image forming data, which includes only the list objects, is output from the image data which also includes other objects (characters, CG, a photo, and the like) shown in FIG. 1.

In addition, it is determined which one thereof the list image forming data is output to, on the basis of the prescribed setting and the user's designation performed through the input/output device 108 (FIG. 4).

Processing (Vertical Direction Connection) of List Connection Determination Portion 310

Figure 8:
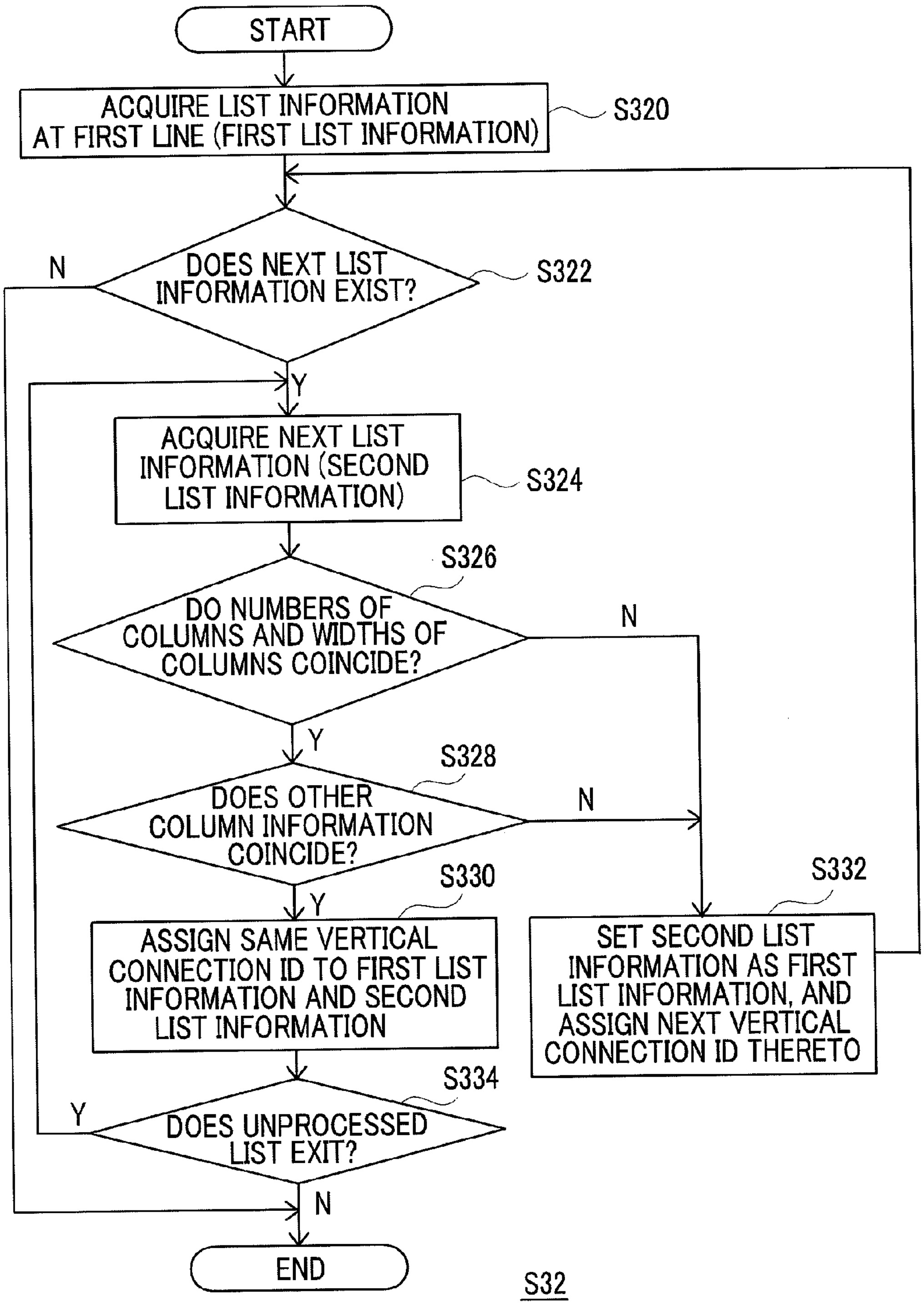
FIG. 8 is a flowchart illustrating list connection determination processing in which the first list connection determination portion shown in FIG. 6 determines whether or not to connect list objects in the vertical direction.

FIG. 8 is a flowchart illustrating list connection determination processing in which the list connection determination portion 310 (FIG. 6) determines whether or not to connect list objects in the vertical direction.

Hereinafter, a description will be further given of the list connection determination processing in which the list connection determination portion 310 determines whether or not to connect the list objects in the vertical direction.

In step 320 (S320), the list connection determination portion 310 acquires list information (for example, list information of which the list ID is "1" in the first list information table of FIG. 7) at the first line of the first list information table as first list information.

In step 322 (S322), the list connection determination portion 310 determines whether or not next list information (for example, list information of which the list ID is "2" in the first list information table of FIG. 7) exists in the first list information table.

If the list connection determination portion 310 determines that the next list information exists, the procedure advances to processing of S324, otherwise the processing ends.

In step 324 (S324), the list connection determination portion 310 acquires the next list information as second list information.

In step 326 (S326), the list connection determination portion 310 determines whether or not the number of columns and the respective column widths of the first list information acquired in S320 coincide with the number of columns and the respective column widths of the second list information acquired in S324.

If the list connection determination portion 310 determines that the numbers of columns and the respective column widths thereof coincide with each other, the procedure advances to processing of S328, otherwise the procedure advances to processing of S332.

In addition, the list connection determination portion 310 may determine that they coincide with each other not only if the column widths completely coincide with each other but also if the difference between the column widths are within a predetermined range.

In step 328 (S328), the list connection determination portion 310 determines whether or not list structure information (hereinafter referred to as "other column information") other than the number of columns and the respective column widths of the first list information acquired in S320 coincides with other column information of the second list information acquired in S324.

Specifically, for example, the list connection determination portion 310 determines whether or not the color difference in average color of the cells in the same column between the first list information and the second list information is within a predetermined range.

Further, for example, the list connection determination portion 310 determines whether or not the shading patterns of cells in the same column between the first list information and the second list information coincide with each other.

For example, in 1st to 3rd pages of the paper document shown in FIG. 3, all the cells in the first columns are shaded by using a dot pattern, and the cells in the other columns are not shaded. Hence, the list connection determination portion 310 determines that the shading patterns coincide with one another.

Further, the list connection determination portion 310 may determine that the shading patterns coincide with one another if a positional relationship of center dots (peak in concentration), which are positioned at the center in main scanning and sub-scanning directions, among the shading dots and a difference in average concentration of the center dots are within predetermined ranges.

Furthermore, for example, the list connection determination portion 310 determines whether or not a difference in color of the vertical ruled line at the same column between the first list information and the second list information and a difference in thickness thereof are within predetermined ranges, and determines whether or not the types of the ruled lines are the same.

If the list connection determination portion 310 determines that other column information pieces coincide with one another, the procedure advances to processing of S330, otherwise the procedure advances to the processing of S332.

In step 330 (S330), the list connection determination portion 310 assigns the same vertical connection ID to the first list information and the second list information.

In step 332 (S332), the list connection determination portion 310 sets the second list information, which is acquired in S324, as new first list information, and assigns a new vertical connection ID (for example, a value obtained by adding 1 to the current vertical connection ID) thereto, and the procedure advances to the S322.

In step 334 (S334), the list connection determination portion 310 determines whether or not the list information, on which the list connection determination processing is not yet performed, exists in the first list information table.

If the list connection determination portion 310 determines that the list information on which the processing is not yet performed exists, the procedure advances to the processing of S324, otherwise the processing ends.

In addition, in the flowchart shown in FIG. 8, it may be determined in S326 that the numbers of columns and the respective column widths coincide with each other, and it may be determined in S328 that the other column information pieces coincide with each other. In this case, it is determined to connect the first list information to the second list information, and the determination of S328 is not required.

In this case, if the list connection determination portion 310 determines that the numbers of columns and the respective column widths coincide with one another in S326, the procedure advances to the processing of S330, otherwise the procedure advances to the processing of S332.

Processing (Horizontal Direction Connection) of List Connection Determination Portion 310

Figure 9:
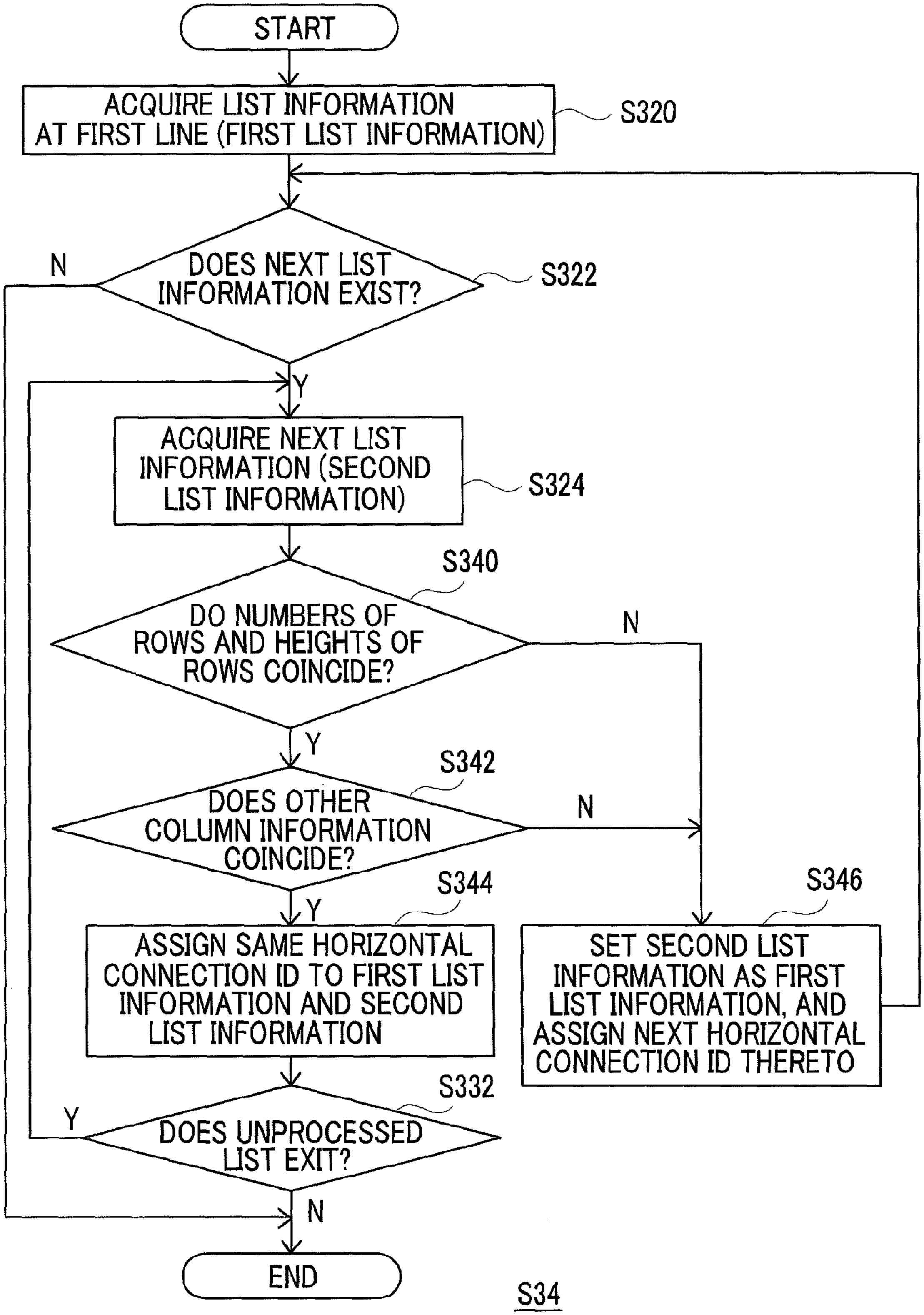
FIG. 9 is a flowchart illustrating list connection determination processing in which the first list connection determination portion shown in FIG. 6 determines whether or not to connect the list objects in the horizontal direction.

FIG. 9 is a flowchart illustrating list connection determination processing in which the list connection determination portion 310 (FIG. 7) determines whether or not to connect list objects in the horizontal direction.

Hereinafter, a description will be further given of the list connection determination processing in which the list connection determination portion 310 determines whether or not to connect the list objects in the horizontal direction.

In steps 320 (S320) to 324 (S324), the list connection determination portion 310 performs the same processing as that of S320 to S324 shown in FIG. 8.

In step 340 (S340), the list connection determination portion 310 determines whether or not the number of rows and the respective row heights of the first list information acquired in S320 coincide with the number of rows and the respective row heights of the second list information acquired in S324.

If the list connection determination portion 310 determines that the numbers of rows and the respective row heights thereof coincide with each other, the procedure advances to processing of S342, otherwise the procedure advances to processing of S346.

In addition, the list connection determination portion 310 may determine that they coincide with each other not only if the row heights completely coincide with each other but also if the difference between the row heights are within a predetermined range.

In step 342 (S342), the list connection determination portion 310 determines whether or not list structure information (hereinafter referred to as "other row information") other than the number of rows and the respective row heights of the first list information acquired in S320 coincides with other row information of the second list information acquired in S324.

Specifically, for example, similarly to S328 (FIG. 8), the list connection determination portion 310 determines whether or not the color difference in average color of the cells in the same row between the first list information and the second list information is within a predetermined range.

Further, for example, similarly to S328 (FIG. 8), the list connection determination portion 310 determines whether or not the shading patterns of all the columns in the same row between the first list information and the second list information coincide with each other.

For example, in the paper document shown in FIG. 3, in the respective rows of each page, the cells in the first columns are shaded by using a dot pattern, and the cells in the other columns are not shaded. Hence, the list connection determination portion 310 determines that the shading patterns do not coincide with each other.

Furthermore, for example, similarly to S328 (FIG. 8), the list connection determination portion 310 determines whether or not a difference in color of the horizontal ruled line at the same row between the first list information and the second list information and a difference in thickness thereof are within predetermined ranges, and determines whether or not the types of the ruled lines are the same.

If the list connection determination portion 310 determines that other row information pieces coincide with one another, the procedure advances to processing of S344, otherwise the procedure advances to the processing of S346.

In step 344 (S344), the list connection determination portion 310 assigns the same horizontal connection ID to the first list information and the second list information.

In step 346 (S346), the list connection determination portion 310 sets the second list information, which is acquired in S324, as new first list information, and assigns a new horizontal connection ID (for example, a value obtained by adding 1 to the current horizontal connection ID) thereto, and the procedure advances to the S322.

In step 332 (S332), the list connection determination portion 310 performs the same processing as S332 shown in FIG. 8.

In addition, in the flowchart shown in FIG. 9, it may be determined in S340 that the numbers of rows and the respective row heights coincide with each other, and it may be determined in S342 that the other row information pieces coincide with each other. In this case, it is determined to connect the first list information to the second list information, and the determination of S342 is not required.

In this case, similarly to the case of the list connection in the vertical direction, if the list connection determination portion 310 determines that the numbers of rows and the respective row heights coincide with one another in S340, the procedure advances to the processing of S344, otherwise the procedure advances to the processing of S346.

First Operation Example of Image Processing Apparatus 1

Hereinafter, a first operation example of the image processing apparatus 1 (FIG. 4) will be described.

In the present operation example, a description will be given of processing in which the image processing apparatus 1 regenerates an electronic document from the plural paper documents (FIG. 3B), on which the list sections (FIG. 3A) in the electronic document are printed, as shown in FIG. 3C.

In the image processing apparatus 1, the divided list objects are scanned from the image data of the plural paper documents, which are read out through the image reading device 106, and the list IDs and storage positions are added to the first list information table (the list scanning portion 306 (FIG. 6)).

That is, in the image processing apparatus 1 of the operation example, as shown in FIG. 7, five list IDs and storage positions are added.

In the image processing apparatus 1, structure information pieces of the respective list objects corresponding to five list IDs are acquired, and are added to the first list information table (FIG. 7) (the list structure acquisition portion 308 (FIG. 6)).

In the image processing apparatus 1, sets of lists connected vertically or horizontally are determined on the basis of the first list information table, and the vertical connection IDs and the horizontal connection IDs are added to the first list information table (the list connection determination portion 310 (FIGS. 6, 8, and 9)).

That is, in the image processing apparatus 1 of the operation example, the vertical connection IDs of the list objects, of which the numbers of columns, the respective column widths, and the shading patterns of the same columns coincide with one another and of which the list IDs correspond to "1" to "3", are set to "1", and the vertical connection IDs of the list objects, of which the list IDs correspond to "4" and "5", are set to "2" (FIG. 7).

Further, in the image processing apparatus 1 of the operation example, since the shading patterns of the cells in the respective rows of each list object are different, the horizontal connection IDs are set to values different from one another (FIG. 7).

In the image processing apparatus 1, on the basis of the vertical connection IDs and horizontal connection IDs of the first list information table, the list objects are connected (the list connection portion 312 (FIG. 6)).

That is, in the image processing apparatus 1 of the operation example, the list objects, of which the vertical connection IDs are "1" and the list IDs are "1" to "3", are connected in the vertical direction, and the list objects, of which the vertical connection IDs are "2" and the list IDs are "4" and "5", are connected in the vertical direction (FIG. 3C).

In the image processing apparatus 1, the character data is embedded in the connected list objects, the list image forming data is generated, and is output to the image forming data combination section 218 (FIG. 5), the printing device 110, and the communication device 112 (FIG. 4), or any one or more thereof (the list image forming portion 314 (FIG. 6)).

Second Exemplary Embodiment

Hereinafter, a second exemplary embodiment of the invention will be described.

FIG. 10A is a diagram illustrating a titled list section, which represents the meaning of each item of the rows or columns, in the electronic document. FIG. 10B is a diagram illustrating plural paper documents which are output by titling and printing the list section shown in FIG. 10A. FIG. 10C is a diagram illustrating an electronic document which is regenerated from the plural paper documents shown in FIG. 10B by the existing image processing apparatus.

The titled list section in the electronic document shown in FIG. 10A is divided and is printed on the plural paper documents such that the title is added thereto as shown in FIG. 10B. In this case, in the image processing apparatus used in the past, as shown in FIG. 10C, an electronic document is regenerated such that the lists printed on the plural paper documents are made as individual lists which are respectively titled.

Figure 11A:
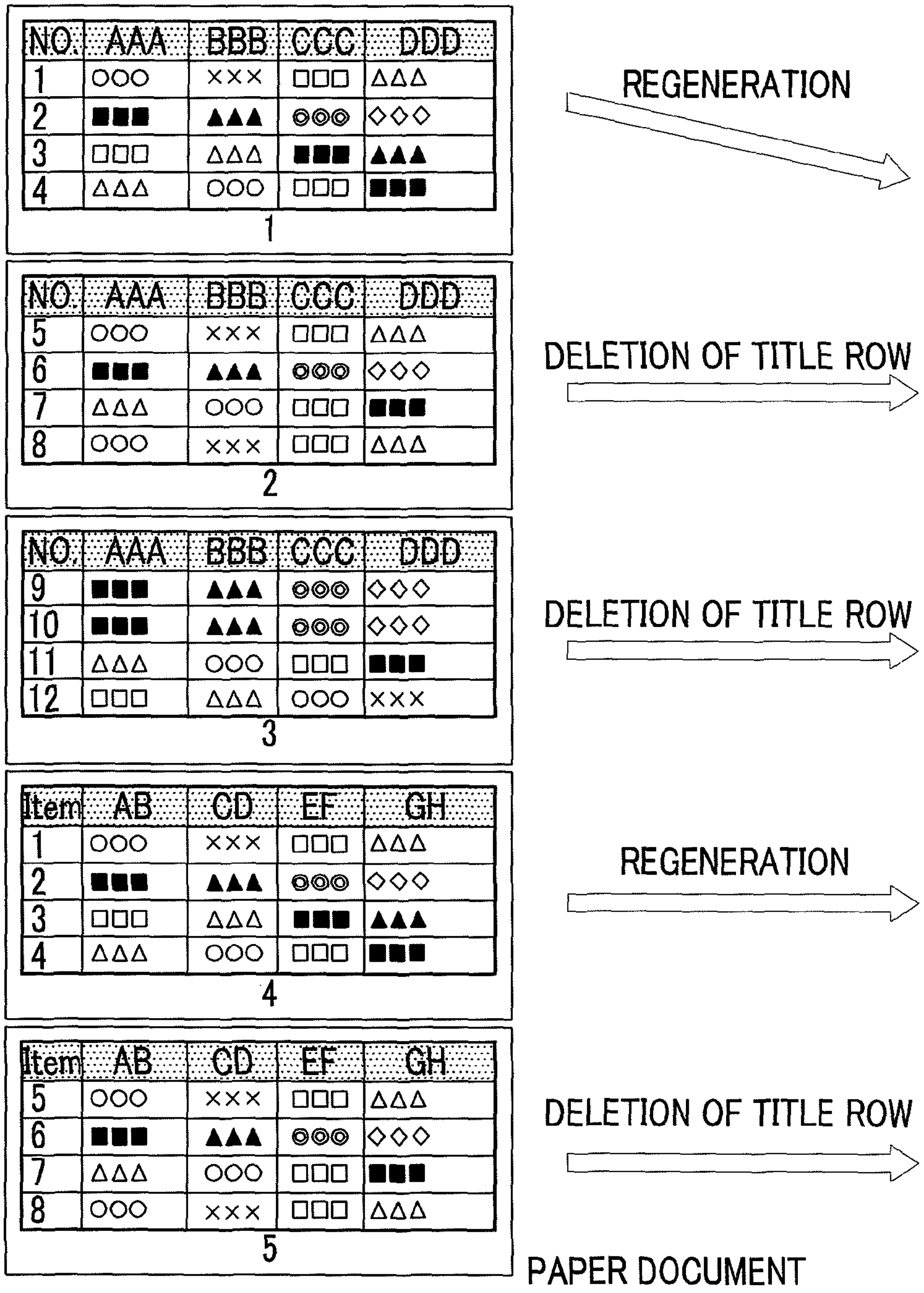
FIG. 11A is a diagram illustrating plural paper documents which are output by titling and printing list sections in an electronic document.
Figure 11B:
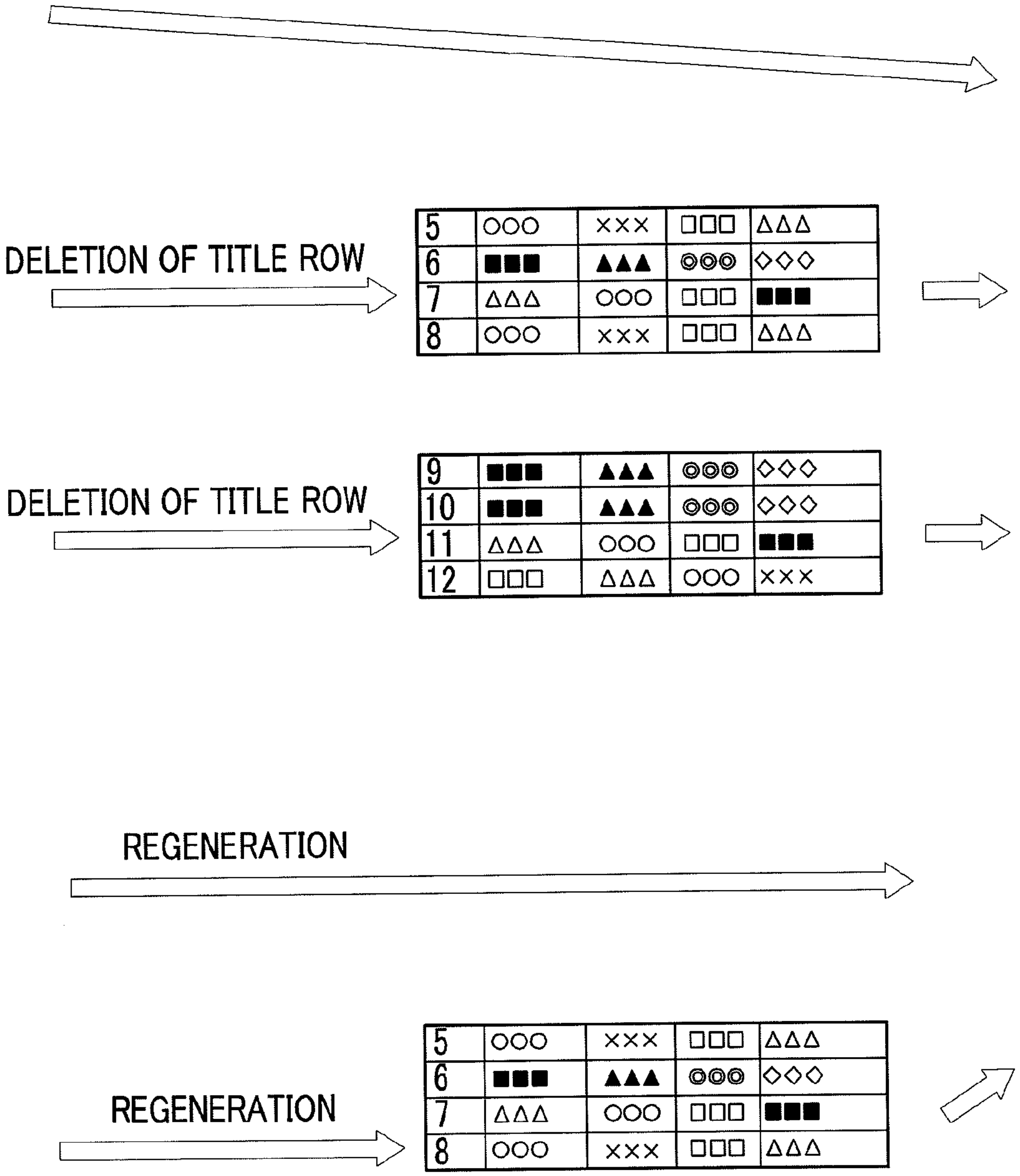
FIG. 11B is a diagram illustrating lists of which title rows are deleted before the regeneration of the electronic document.

FIG. 11A is a diagram illustrating plural paper documents which are output by titling and printing list sections in an electronic document. FIG. 11B is a diagram illustrating lists of which title rows are deleted before the regeneration of the electronic document. FIG. 11C is a diagram illustrating an electronic document which is regenerated by an image processing apparatus 1 according to the exemplary embodiment of the invention.

The image processing apparatus 1 according to the exemplary embodiment of the invention to be described below is made under the above-mentioned background. In the second exemplary embodiment of the invention, as a specific example, the following case is given: an electronic document is regenerated as shown in FIG. 11C so as to have titled lists (FIG. 11A) with the same structure as the original electronic document.

Second List Image Forming Processing Program 40

Figure 12:
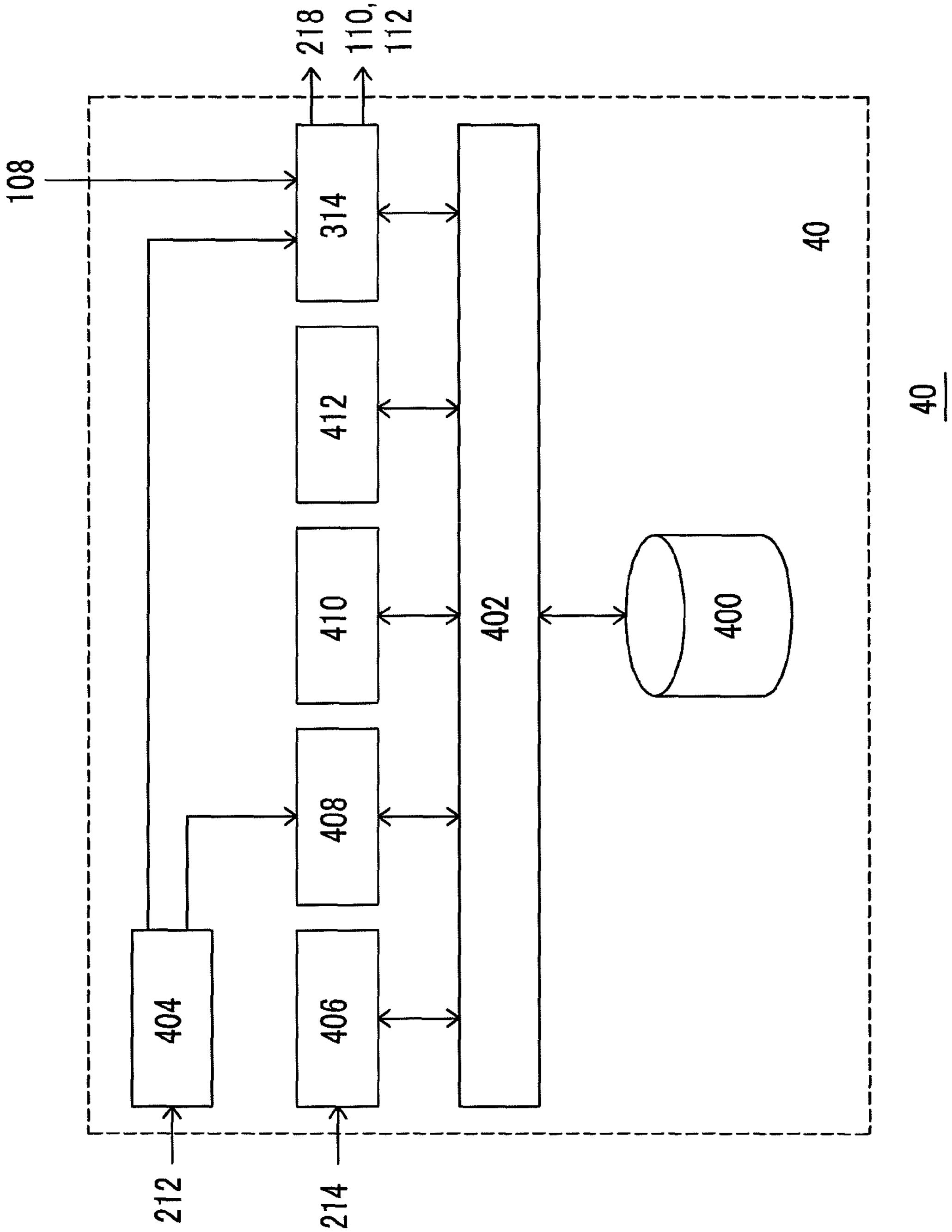
FIG. 12 is a diagram illustrating a configuration of a second list image forming processing program of a second electronic document generation program which is applied in replacement of a first list image forming processing program of the first electronic document generation program shown in FIG. 5.

FIG. 12 is a diagram illustrating configurations of the first list image forming processing program 30 of the first electronic document generation program 20 shown in FIG. 5 according to the first exemplary embodiment of the invention and a second list image forming processing program 40 of a replaced second electronic document generation program 24.

As shown in FIG. 12, the list image forming processing program 40 includes: a second list information memory 400; a second controller 402; a second character data memory 404; a second list scanning portion 406; a title acquisition portion 408; a second list connection determination portion 410; a second list connection portion 412; and the list image forming portion 314.

The list image forming processing program 40 generates list image forming data from the image data of the plural paper documents, in which the titled list section in the electronic document is divided and printed, so as to create the titled list with the same structure as that of the original electronic document.

In addition, hereinafter, in the exemplary embodiment, a title is shown at the first row of the list, and as a specific example, a case where the divided lists are connected in the vertical direction will be described.

FIG. 13 is a diagram illustrating a second list information table which is stored in the list information memory 400.

The list information memory 400 stores the second list information table, which is updated and referenced by the respective components shown in FIG. 12, through the controller 402.

As shown in FIG. 13, the respective list information pieces of the second list information table include, for example similarly to the first list information table shown in FIG. 7, the list IDs and the storage positions of the list objects. In addition, the information pieces also include: title row information representing contents of the respective cells in the title row; and connection IDs for identifying sets of the connected list objects.

For example, as shown in FIG. 13, the list object of which the list ID is "1" is stored at the address "p1", contents of the respective cells in the title row thereof are "No.", "AAA", "BBB", "CCC", and "DDD" in order from the left cell, and the connection ID thereof is "1".

The controller 402 (FIG. 12) controls the respective components.

Similarly to the character data memory 304 shown in FIG. 6, the character data memory 404 receives the character data which is input from the OCR section 212 (FIG. 5), and stores the data such that title acquisition portion 408 and the list image forming portion 314 are able to refer to the data.

Similarly to the list scanning portion 306 shown in FIG. 6, the list scanning portion 406 scans the list objects, which are input from the ruled line correction processing section 214 (FIG. 5), so as to acquire the storage positions of the list objects and respectively assign the list IDs to the list objects.

Further, the list scanning portion 406 adds the assigned list IDs and the acquired storage positions to the second list information table, which is stored in the list information memory 400, through the controller 402.

The title acquisition portion 408 accesses the storage positions (FIG. 13) of the list objects with reference to the second list information table, which is stored in the list information memory 400, through the control of the controller 402, thereby acquiring the list objects.

Further, the title acquisition portion 408 acquires characters at the positions corresponding to the respective cells in the first rows of the respective acquired list objects with reference to the character data which is stored in the character data memory 404.

Further, the title acquisition portion 408 adds the acquired characters to the second list information table, which is stored in the list information memory 400, through the controller 402.

The list connection determination portion 410 determines sets of connected lists through the control of the controller 402, on the basis of the title row information corresponding to each list ID, with reference to the ascending order of the list IDs of the second list information table which is stored in the list information memory 400 (a description thereof will be given later with reference to FIG. 14).

Further, on the basis of the determination result, the list connection determination portion 410 adds the connection IDs of the respective lists to the second list information table, which is stored in the list information memory 400, through the controller 402 (a description thereof will be given later with reference to FIG. 14).

The list connection portion 412 connects the respective list objects with reference to the connection IDs (FIG. 13) of the second list information table, which is stored in the list information memory 400, through the control of the controller 402, and outputs the connected list objects to the list image forming portion 314 (a description thereof will be given later with reference to FIG. 15).

Processing of List Connection Determination Portion 410

Figure 14:
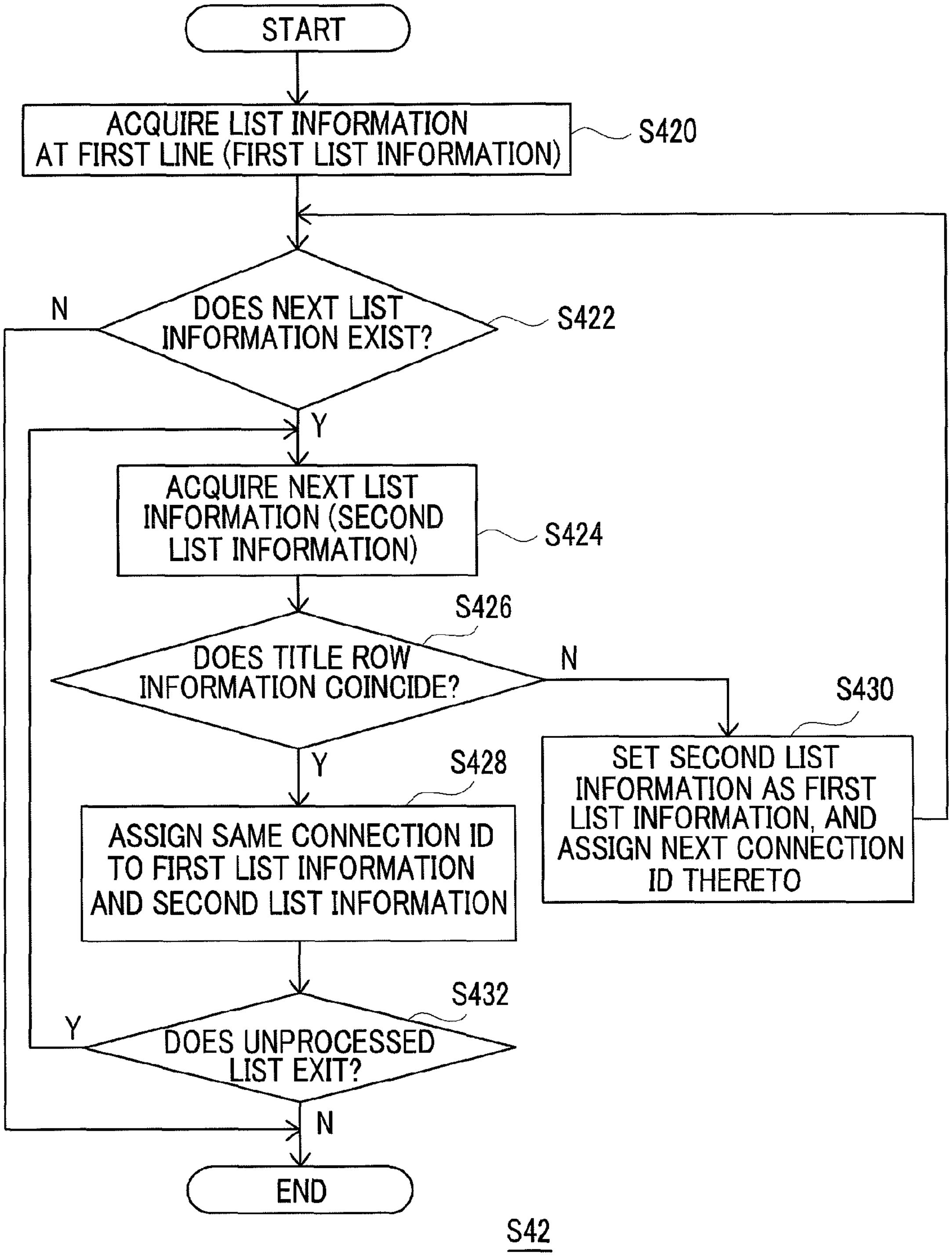
FIG. 14 is a flowchart illustrating list connection determination processing in which the second list connection determination portion shown in FIG. 12 determines whether or not to connect the list objects.

FIG. 14 is a flowchart illustrating list connection determination processing in which the list connection determination portion 410 (FIG. 12) determines whether or not to connect list objects.

Hereinafter, a description will be further given of the list connection determination processing in which the list connection determination portion 410 determines whether or not to connect the list objects.

In step 420 (S420), the list connection determination portion 410 acquires list information (for example, list information of which the list ID is "1" in the second list information table of FIG. 13) at the first line of the second list information table as first list information.

In step 422 (S422), the list connection determination portion 410 determines whether or not next list information (for example, list information of which the list ID is "2" in the second list information table of FIG. 13) exists in the second list information table.

If the list connection determination portion 410 determines that the next list information exists, the procedure advances to processing of S424, otherwise the processing ends.

In step 424 (S424), the list connection determination portion 410 acquires the next list information as second list information.

In step 426 (S426), the list connection determination portion 410 determines whether or not the title row information of the first list information acquired in S420 coincides with the title row information of the second list information acquired in S424.

If the list connection determination portion 410 determines that the title row information pieces thereof coincide with each other, the procedure advances to processing of S428, otherwise the procedure advances to processing of S430.

In addition, the list connection determination portion 410 may determine that the title row information pieces coincide with each other if at least one same title exists in the same columns of the title row information pieces of the first list information and the second list information.

Further, the list connection determination portion 410 may determine that the title row information pieces coincide with each other if at least one same title exists in the same columns and if the numbers of columns or the numbers of columns and the widths of the respective columns of the first list information and the second list information coincide with each other.

In step 428 (S428), the list connection determination portion 410 assigns the same connection ID to the first list information and the second list information.

In step 430 (S430), the list connection determination portion 410 sets the second list information, which is acquired in S424, as new first list information, and assigns a new connection ID (for example, a value obtained by adding 1 to the current connection ID) thereto, and the procedure advances to the S422.

In step 432 (S432), the list connection determination portion 410 determines whether or not the list information, on which the list connection determination processing is not yet performed, exists in the second list information table.

If the second list connection determination portion 410 determines that the list information on which the processing is not yet performed exists, the procedure advances to the processing of S424, otherwise the processing ends.

Processing of List Connection Portion 412

Figure 15:
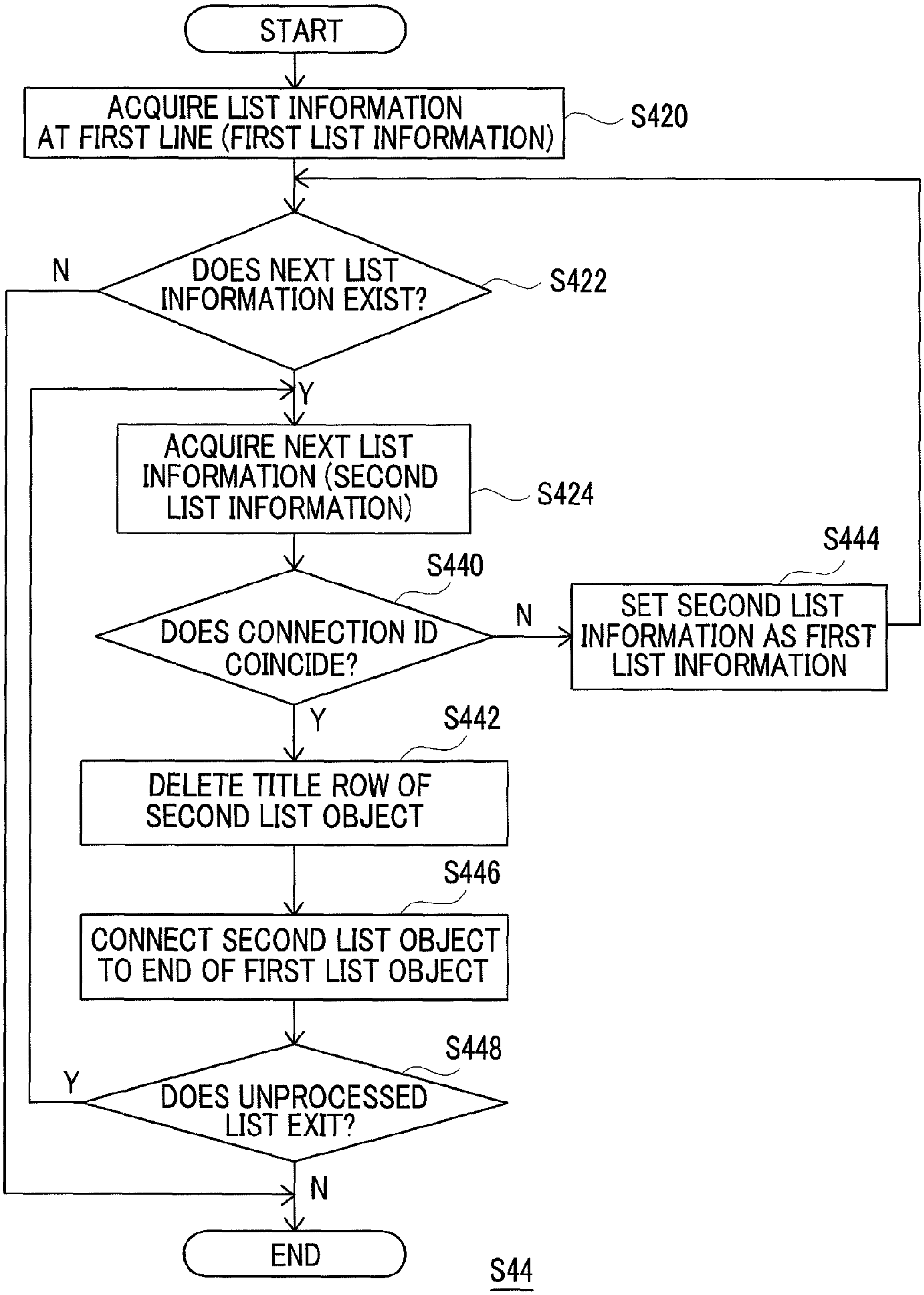
FIG. 15 is a flowchart illustrating the list connection processing in which the second list connection portion shown in FIG. 12 connects the list objects.

FIG. 15 is a flowchart illustrating the list connection processing in which the list connection portion 412 (FIG. 12) connects the list objects.

Hereinafter, a description will be further given of the list connection processing in which the list connection portion 412 connects the list objects.

In steps 420 (S420) to 424 (S424), the list connection portion 412 performs the same processing as that of S420 to S424 shown in FIG. 14.

In step 440 (S440), the list connection portion 412 determines whether or not the connection ID of the first list information acquired in S420 coincides with the connection ID of the second list information acquired in S424.

If the list connection portion 412 determines that the connection IDs thereof coincide with each other, the procedure advances to processing of S442, otherwise the procedure advances to processing of S444.

In step 442 (S442), the list connection portion 412 accesses the storage position of the second list information acquired in S424, acquires the list objects (the second list objects), and deletes the first rows corresponding to the title rows of the acquired second list objects.

In step 444 (S444), the list connection portion 412 sets the second list information as the first list information, and the procedure advances to the processing of S422.

In step 446 (S446), the list connection portion 412 accesses the storage position of the first list information acquired in S420, acquires the list objects (the first list objects), and connects the second list objects, of which the title rows are deleted, to the tail ends of the acquired first list objects.

In step 448 (S448), the list connection portion 412 determines whether or not the lists object, on which the list connection processing is not yet performed, exists in the second list information table.

If the list connection portion 412 determines that the list object on which the processing is not yet performed exists, the procedure advances to the processing of S424, otherwise the processing ends.

Second Operation Example of Image Processing Apparatus 1

Hereinafter, a second operation example of the image processing apparatus 1 (FIG. 4) will be described.

In the present operation example, a description will be given of processing in which the image processing apparatus 1 regenerates an electronic document from the plural paper documents (FIG. 11A), on which the titled list sections in the electronic document are printed, as shown in FIG. 11C.

In the image processing apparatus 1, the divided list objects are scanned from the image data of the plural paper documents, which are readout through the image reading device 106, and the list IDs and storage positions are added to the second list information table (the list scanning portion 406 (FIG. 12)).

That is, in the image processing apparatus 1 of the operation example, as shown in FIG. 13, five list IDs and storage positions are added.

In the image processing apparatus 1, title row information pieces of the respective list objects corresponding to five list IDs are acquired, and are added to the second list information table (FIG. 13) (the title acquisition portion 408 (FIG. 12)).

In the image processing apparatus 1, sets of connected lists are determined on the basis of the second list information table, and the connection IDs are added to the second list information table (the list connection determination portion 410 (FIGS. 12 and 14)).

That is, in the image processing apparatus 1 of the operation example, the connection IDs of the list objects, of which the title row information pieces coincide with one another and of which the list IDs correspond to “1” to “3”, are set to “1”, and the connection IDs of the list objects, of which the list IDs correspond to “4” and “5”, are set to “2” (FIG. 13).

In the image processing apparatus 1, on the basis of the connection IDs of the second list information table, the list objects are connected (the list connection portion 412 (FIGS. 12 and 15)).

That is, in the image processing apparatus 1 of the operation example, the title rows are deleted from the list objects, of which the list IDs are “2” and “3”, among the list objects of which the connection IDs are “1” and the list IDs are “1” to “3” (FIG. 11B), and then the list objects, of which the list IDs are “2” and “3”, are sequentially connected to the tail end of the list object of which the list ID is “1” in the vertical direction (FIG. 11C).

Further, in the image processing apparatus 1, the title row is deleted from the list object, of which the list ID is “5”, among the list objects of which the connection IDs are “2” and the list IDs are “4” and “5” (FIG. 11B), and then the list object, of which the list ID is “5”, is connected to the tail end of the list object of which the list ID is “4” in the vertical direction (FIG. 11C).

In the image processing apparatus 1, the character data is embedded in the connected list objects, the list image forming data is generated, and is output to the image forming data combination section 218 (FIG. 5), the printing device 110, and the communication device 112 (FIG. 4), or any one or more thereof (the list image forming portion 314 (FIG. 12)).

Modified Example of Second Exemplary Embodiment

The exemplary embodiment described in the specific example in which the title is shown at the first row of the list and the divided lists are connected in the vertical direction, but the invention is not limited to this. For example, in the exemplary embodiment, the title may be shown at the first column of the list, and the divided lists may be connected in the horizontal direction.

In this case, the title acquisition portion 408 acquires the characters at the positions corresponding to the respective cells in the first column of each list object, with reference to the character data which is stored in the character data memory 404.

Further, the title acquisition portion 408 adds the acquired characters as title column information to the second list information table, which is stored in the list information memory 400, through the controller 402.

Further, similarly to the list connection determination processing shown in FIG. 14, the list connection determination portion 410 determines the sets of the connected lists on the basis of the title column information, and adds the connection IDs thereof to the second list information table, which is stored in the list information memory 400, through the controller 402.

Similarly to the list connection processing shown in FIG. 15, the list connection portion 412 connects the respective list objects in the horizontal direction on the basis of the connection IDs.

Further, both exemplary embodiments may be combined as follows: if the title positions of the lists are extracted and the positions of the titles are the first rows of the lists, the vertical list connection processing is performed; and if the positions of the titles are the first columns of the lists, the horizontal list connection processing is performed.

Further, the exemplary embodiment may be applied to a case where the titles are shown at the last rows of lists or the last columns of the lists.

Third Exemplary Embodiment

Hereinafter, a third exemplary embodiment of the invention will be described.

In the third exemplary embodiment of the invention, as a specific example, the following case is given: either one of the first exemplary embodiment and the second exemplary embodiment is selected in accordance with presence or absence of each title of the list sections in the electronic document, and the list image forming data is generated from the image data of the plural paper documents such that the lists of the data have the same structure as the lists of the original electronic document.

Third List Image Forming Processing Program 50

Figure 16:
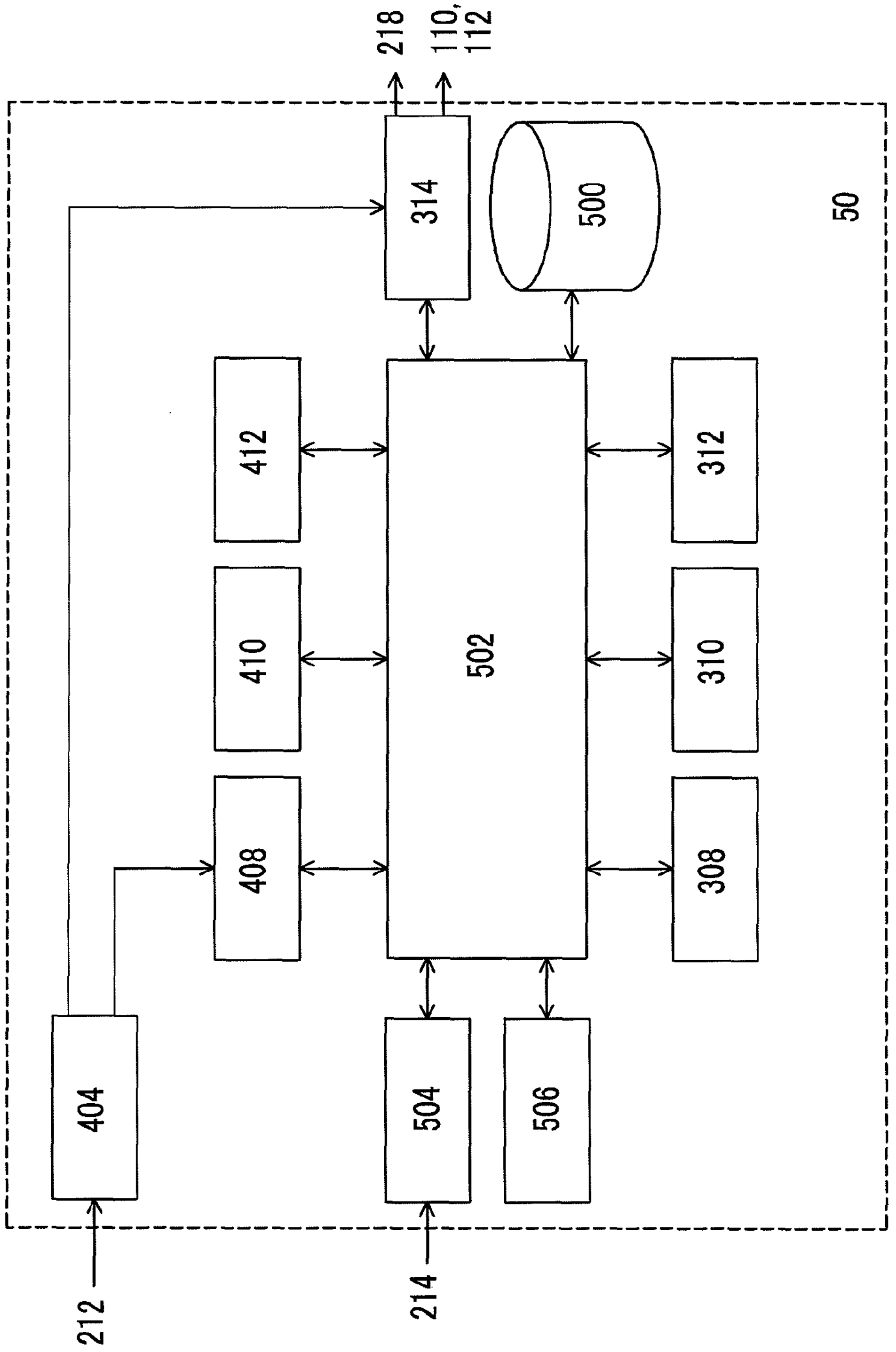
FIG. 16 is a diagram illustrating a configuration of a third list image forming processing program of a third electronic document generation program which is applied in replacement of the first list image forming processing program of the first electronic document generation program shown in FIG. 5.

FIG. 16 is a diagram illustrating a configuration of a third list image forming processing program 50 of a third electronic document generation program 26 which is applied in replacement of the first list image forming processing program 30 of the first electronic document generation program 20 shown in FIG. 5 according to the first exemplary embodiment of the invention.

As shown in FIG. 16, the third list image forming processing program 50 includes: a third list information memory 500; a third controller 502; a third list scanning portion 504; a selection portion 506; the list structure acquisition portion 308; the first list connection determination portion 310; the first list connection portion 312; the list image forming portion 314; the second character data memory 404; the title acquisition portion 408; the second list connection determination portion 410; and the second list connection portion 412.

The list image forming processing program 50 selects either one of the first exemplary embodiment and the second exemplary embodiment in accordance with presence or absence of each title of the list sections in the electronic document, and generates list image forming data.

The list information memory 500 stores the third list information table, which is updated and referenced by the respective components shown in FIG. 16, through the controller 502.

The respective list information pieces of the third list information table include, for example similarly to the first list information table shown in FIG. 7, the list IDs and the storage positions of the list objects. In addition, the information pieces also include: title presence information representing presence or absence of the title of each list object.

Further, the list information memory 500 stores the first list information table shown in FIG. 7 and the second list information table shown in FIG. 13 in accordance with the selection between the first exemplary embodiment and the second exemplary embodiment in the selection portion 506.

The controller 502 controls the respective components.

Similarly to the list scanning portion 306 shown in FIG. 6, the list scanning portion 504 scans the list objects, which are input from the ruled line correction processing section 214 (FIG. 5), so as to acquire the storage positions of the list objects and respectively assign the list IDs to the list objects.

Further, the list scanning portion 504 acquires the list objects by accessing the storage positions of the list objects. For example, if a form set in the first row or the first column of the list object is different from that of the other rows or columns, it is determined that the title is present, otherwise it is determined that the title is absent, thereby generating the title presence information.

Further, the list scanning portion 504 adds the assigned list IDs, the acquired storage positions, and the generated title presence information to the third list information table, which is stored in the list information memory 500, through the controller 502.

The selection portion 506 selects the list connection method in accordance with the title presence information of the third list information table, which is stored in the list information memory 500, through the control of the controller 502.

Specifically, for example, when the title presence information in the list information of the third list information table represents that the title is present, the selection portion 506 outputs the list information pieces of the list objects with the list IDs, of which the values are continuous, as one second list information table to the list information memory 500 through the controller 502.

Further, for example, when the title presence information in the list information of the third list information table represents that the title is absent, the selection portion 506 outputs the list information pieces of the list objects with the list IDs, of which the values are continuous, as one first list information table to the list information memory 500 through the controller 502.

MODIFIED EXAMPLE 1

In the first to third exemplary embodiments of the invention, the first to third list image forming processing programs 30, 40, and 50 perform the processing for the list connection on all the list objects as processing targets, and then connects the list objects, thereby generating the list image forming data. However, the list connection processing may be sequentially performed for each list object.

MODIFIED EXAMPLE 2

In the first to third exemplary embodiments of the invention, the list connection determination of the list objects and the list connection processing are performed in the order in which the pieces of the image data including the list objects are read out. However, for example, as shown in FIGS. 3B and 11A, in the case where the page numbers of the respective plural paper documents are printed, by recognizing the page numbers from the readout image data, each processing for the list objects may be performed in the order of the page numbers.

MODIFIED EXAMPLE 3

In the first to third exemplary embodiments of the invention, on the basis of the connection IDs which are added to the list information tables by the first and second list connection determination portions 310 and 410, the first and second list connection portions 308 and 408 may perform the list connection processing (FIGS. 8, 9, and 14) of the list objects. However, before the list connection processing is performed, for example, by displaying the result of the list connection determination processing to a user, in response to receiving the list connection instruction from the user, the list connection processing may be performed.

MODIFIED EXAMPLE 4

In the first to third exemplary embodiments of the invention, the first and second list connection determination portions 310 and 410 perform the list connection determination processing on the list objects which are divided by the object separation section 204 (FIG. 5). However, the first and second list connection determination portions 310 and 410 may perform the list connection determination processing with reference to not only the list objects but also the image data obtained before the division of the objects.

Specifically, for example, the first and second list connection determination portions 310 and 410 may determine that the other object (characters, CG, a photo, or the like) is included between the first list object and the second list object. In this case, even when the list structure and title information pieces of the first and second list objects coincide with each other, the first and second list connection determination portions 310 and 410 determines not to connect both list objects.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a structure information acquisition portion that acquires, from a list which is included in each of a plurality of pieces of image data sorted in a predetermined order and is formed of rows and columns, structure information which includes row information including at least the number of the rows of the list and heights of the respective rows thereof, and column information including at least the number of the columns thereof and the widths of the respective columns thereof;

a list connection determination portion that determines, on the basis of the acquired structure information, a set of connected lists among the lists respectively included in the plurality of pieces of the image data, and a connection direction of the connected lists; and a list connection portion that connects the set of the determined lists in the determined connection direction in an order of the plurality of pieces of the image data listed.

2. The image processing apparatus according to claim 1, wherein the list connection determination portion determines whether or not the column information pieces of the lists respectively included in the plurality of pieces of the image data coincide with one another, determines the lists, for which it is determined that the column information pieces coincide with one another and which are adjacent to one another in the order of the plurality of pieces of the image data listed, as the set of the connected lists, and determines the connection direction as a down direction of the lists.

3. The image processing apparatus according to claim 2, wherein each column information further includes attribute information representing attributes of cells which constitute each list and which are uniquely specified by the rows and the columns.

4. The image processing apparatus according to claim 3, wherein the attribute information includes color information pieces of the respective cells constituting the list, and wherein the list connection determination portion determines whether or not the color information pieces of the cells in the same columns of the respective lists included in the plurality of pieces of the image data coincide with each other.

5. The image processing apparatus according to claim 4, wherein the attribute information includes base information pieces of the respective cells constituting the list, and wherein the list connection determination portion determines whether or not the base information pieces of the cells in the same columns of the respective lists included in the plurality of pieces of the image data coincide with each other.

6. The image processing apparatus according to claim 4, wherein the attribute information includes column-line information pieces representing attributes of vertical ruled lines of the cells constituting the list, and wherein the list connection determination portion determines whether or not the column-line information pieces of the cells in the same columns of the respective lists included in the plurality of pieces of the image data coincide with each other.

7. The image processing apparatus according to claim 3, wherein the attribute information includes base information pieces of the respective cells constituting the list, and wherein the list connection determination portion determines whether or not the base information pieces of the cells in the same columns of the respective lists included in the plurality of pieces of the image data coincide with each other.

8. The image processing apparatus according to claim 7, wherein the attribute information includes column-line information pieces representing attributes of vertical ruled lines of the cells constituting the list, and wherein the list connection determination portion determines whether or not the column-line information pieces of the cells in the same columns of the respective lists included in the plurality of pieces of the image data coincide with each other.

9. The image processing apparatus according to claim 3, wherein the attribute information includes column-line information pieces representing attributes of vertical ruled lines of the cells constituting the list, and wherein the list connection determination portion determines whether or not the column-line information pieces of the cells in the same columns of the respective lists included in the plurality of pieces of the image data coincide with each other.

10. The image processing apparatus according to claim 1, wherein the list connection determination portion determines whether or not the row information pieces of the lists respectively included in the plurality of pieces of the image data coincide with one another, determines the lists, for which it is determined that the row information pieces coincide with one another and which are adjacent to one another in the order of the plurality of pieces of the image data listed, as the set of the connected lists, and determines the connection direction as a right direction of the lists.

11. The image processing apparatus according to claim 10, wherein each row information further includes attribute information representing attributes of cells which constitute each list and which are uniquely specified by the rows and the columns.

12. The image processing apparatus according to claim 11, wherein the attribute information includes color information pieces of the respective cells constituting the list, and wherein the list connection determination portion determines whether or not the color information pieces of the cells in the same rows of the respective lists included in the plurality of pieces of the image data coincide with each other.

13. The image processing apparatus according to claim 12, wherein the attribute information includes base information pieces of the respective cells constituting the list, and wherein the list connection determination portion determines whether or not the base information pieces of the cells in the same rows of the respective lists included in the plurality of pieces of the image data coincide with each other.

14. The image processing apparatus according to claim 11, wherein the attribute information includes base information pieces of the respective cells constituting the list, and wherein the list connection determination portion determines whether or not the base information pieces of the cells in the same rows of the respective lists included in the plurality of pieces of the image data coincide with each other.

15. The image processing apparatus according to claim 11, wherein the attribute information includes row-line information pieces representing attributes of horizontal ruled lines of the cells constituting the list, and wherein the list connection determination portion determines whether or not the row-line information pieces of the cells in the same rows of the respective lists included in the plurality of pieces of the image data coincide with each other.

16. The image processing apparatus according to claim 1, wherein the plurality of pieces of the image data are generated by reading out an image from a paper document.

17. The image processing apparatus according to claim 16, wherein the predetermined order represents an order in which the paper document is read out.

18. The image processing apparatus according to claim 1, wherein the plurality of pieces of the image data include order information which specifies a sorting order, and wherein the predetermined order represents an order which is specified by the order information.

19. An image processing method comprising:

acquiring, from a list which is included in each of a plurality of pieces of image data sorted in a predetermined order and is formed of rows and columns, structure information which includes row information including at least the number of the rows of the list and heights of the respective rows thereof and column information including at least the number of the columns thereof and the widths of the respective columns thereof;

determining, on the basis of the acquired structure information, a set of connected lists among the lists respectively included in the plurality of pieces of the image data, and a connection direction of the connected lists; and connecting the set of the determined lists in the determined connection direction in an order of the plurality of pieces of the image data listed.

20. A non-transitory computer readable medium storing a program for causing a computer to execute a process, the process comprising:

acquiring, from a list which is included in each of a plurality of pieces of image data sorted in a predetermined order and is formed of rows and columns, structure information which includes row information including at least the number of the rows of the list and heights of the respective rows thereof and column information including at least the number of the columns thereof and the widths of the respective columns thereof;

determining, on the basis of the acquired structure information, a set of connected lists among the lists respectively included in the plurality of pieces of the image data, and a connection direction of the connected lists; and connecting the set of the determined lists in the determined connection direction in an order of the plurality of pieces of the image data listed.

* * * * *